(12) United States Patent
Zhou et al.

(10) Patent No.: US 10,028,289 B2
(45) Date of Patent: Jul. 17, 2018

(54) WIRELESS COMMUNICATIONS METHOD, WIRED TRANSMISSION DETECTION METHOD, AND RELATED DEVICE AND SYSTEM

(71) Applicant: Huawei Technologies Co., Ltd., Shenzhen (CN)

(72) Inventors: Lei Zhou, Shenzhen (CN); Yuqun Fan, Shenzhen (CN); Weihua Qiao, Beijing (CN)

(73) Assignee: HUAWEI TECHONOLOGIES CO., LTD., Shenzhen (CN)

( * ) Notice: Subject to any disclaimer, the term of this patent is extended or adjusted under 35 U.S.C. 154(b) by 183 days.

(21) Appl. No.: 14/971,447

(22) Filed: Dec. 16, 2015

(65) Prior Publication Data

US 2016/0105899 A1  Apr. 14, 2016

Related U.S. Application Data

(63) Continuation of application No. PCT/CN2014/072470, filed on Feb. 24, 2014.

(30) Foreign Application Priority Data

Jul. 23, 2013  (CN) .......................... 2013 1 0311794

(51) Int. Cl.
| | | |
|---|---|---|
| *H04W 72/08* | (2009.01) | |
| *H04W 28/24* | (2009.01) | |
| (Continued) | | |

(52) U.S. Cl.
CPC ....... *H04W 72/085* (2013.01); *H04L 43/0829* (2013.01); *H04L 47/18* (2013.01); *H04L 65/80* (2013.01); *H04W 28/24* (2013.01)

(58) Field of Classification Search
CPC ..... H04L 65/80; H04L 47/18; H04L 43/0829; H04L 47/10; H04W 28/24; H04W 72/085; H04W 28/16
See application file for complete search history.

(56) References Cited

U.S. PATENT DOCUMENTS

| | | |
|---|---|---|
| 2008/0273520 A1 | 11/2008 | Kim et al. |
| 2011/0044200 A1 | 2/2011 | Kulyk et al. |
| (Continued) | | |

FOREIGN PATENT DOCUMENTS

| | | |
|---|---|---|
| CN | 1739310 A | 2/2006 |
| CN | 101188518 A | 5/2008 |
| (Continued) | | |

OTHER PUBLICATIONS

Foreign Communication From A Counterpart Application, European Application No. 14828706.3, Extended European Search Report dated Apr. 21, 2016, 8 pages.

(Continued)

*Primary Examiner* — Paul H Masur
(74) *Attorney, Agent, or Firm* — Conley Rose, P.C.

(57) ABSTRACT

A wireless communications method is provided. The method includes acquiring, by a policy and charging rules function (PCRF) entity, a first parameter, a second parameter, and state information of a current service of a base station; determining, according to the first parameter and the second parameter, and with reference to the state information of the current service of the base station, whether a condition for guaranteeing quality of service (QoS) of a service is satisfied; and if it is determined that the condition for guaranteeing the QoS of the service is satisfied, permitting providing a user equipment with the first service having a corresponding QoS guarantee; or if it is determined that the condition for guaranteeing the QoS of the service is not satisfied, performing a first operation. The method is applied to the field of communications.

17 Claims, 16 Drawing Sheets

(51) Int. Cl.
*H04L 29/06* (2006.01)
*H04L 12/26* (2006.01)
*H04L 12/801* (2013.01)

(56) References Cited

U.S. PATENT DOCUMENTS

| | | | |
|---|---|---|---|
| 2011/0294539 A1 | 12/2011 | Shin et al. | |
| 2012/0108343 A1* | 5/2012 | Marsico | H04W 8/20 463/42 |
| 2012/0247938 A1 | 10/2012 | Saito et al. | |
| 2012/0250660 A1 | 10/2012 | Karlsson | |
| 2012/0324100 A1* | 12/2012 | Tomici | H04L 45/123 709/224 |
| 2013/0012260 A1* | 1/2013 | Salkintzis | H04W 48/08 455/550.1 |

FOREIGN PATENT DOCUMENTS

| | | |
|---|---|---|
| CN | 102256314 A | 11/2011 |
| CN | 102263672 A | 11/2011 |
| CN | 102595518 A | 7/2012 |
| CN | 103857052 A | 6/2014 |
| JP | 20120208732 A | 10/2012 |
| WO | 2004064424 A1 | 7/2004 |

OTHER PUBLICATIONS

Partial English Translation and Abstract of Japanese Patent Application No. JPA2012208732, Apr. 11, 2016, 33 pages.
Shiozawa, N., et al., "Trend of Paste Material," New Touch Panel Practical Course, Japan, Technotimes Corporation, Apr. 13, 2011, pp. 167-170.
Foreign Communication From A Counterpart Application, Japanese Application No. 2015-543266, Japanese Office Action dated Jan. 26, 2016, 5 pages.
Foreign Communication From A Counterpart Application, Japanese Application No. 2015-543266, English Translation of Japanese Office Action dated Jan. 26, 2016, 6 pages.
"3rd Generation Partnership Project; Technical Specification Group Services and System Aspects; Policy and charging control architecture (Release 12)," 3GPP TS 23.203, V12.1.0, Technical Specification, Jun. 2013, 189 pages.
Partial English Translation and Abstract of Chinese Patent Application No. CN101188518, Apr. 5, 2016, 6 pages.
Partial English Translation and Abstract of Chinese Patent Application No. CN103857052, Apr. 8, 2016, 24 pages.
Partial English Translation and Abstract of Chinese Patent Application No. CN102263672, Dec. 10, 2015, 7 pages.
Partial English Translation and Abstract of Chinese Patent Application No. CN102595518, Dec. 10, 2015, 4 pages.
Foreign Communication From A Counterpart Application, PCT Application No. PCT/CN2014/072470, English Translation of International Search Report dated May 23, 2014, 2 pages.
Foreign Communication From A Counterpart Application, PCT Application No. PCT/CN2014/072470, English Translation of Written Opinion dated May 23, 2014, 12 pages.
Machine Translation and Abstract of Chinese Publication No. CN102256314, Nov. 23, 2011, 11 pages.
Foreign Communication From A Counterpart Application, Chinese Application No. 201310311794.9, Chinese Office Action dated Jun. 26, 2017, 7 pages.

* cited by examiner

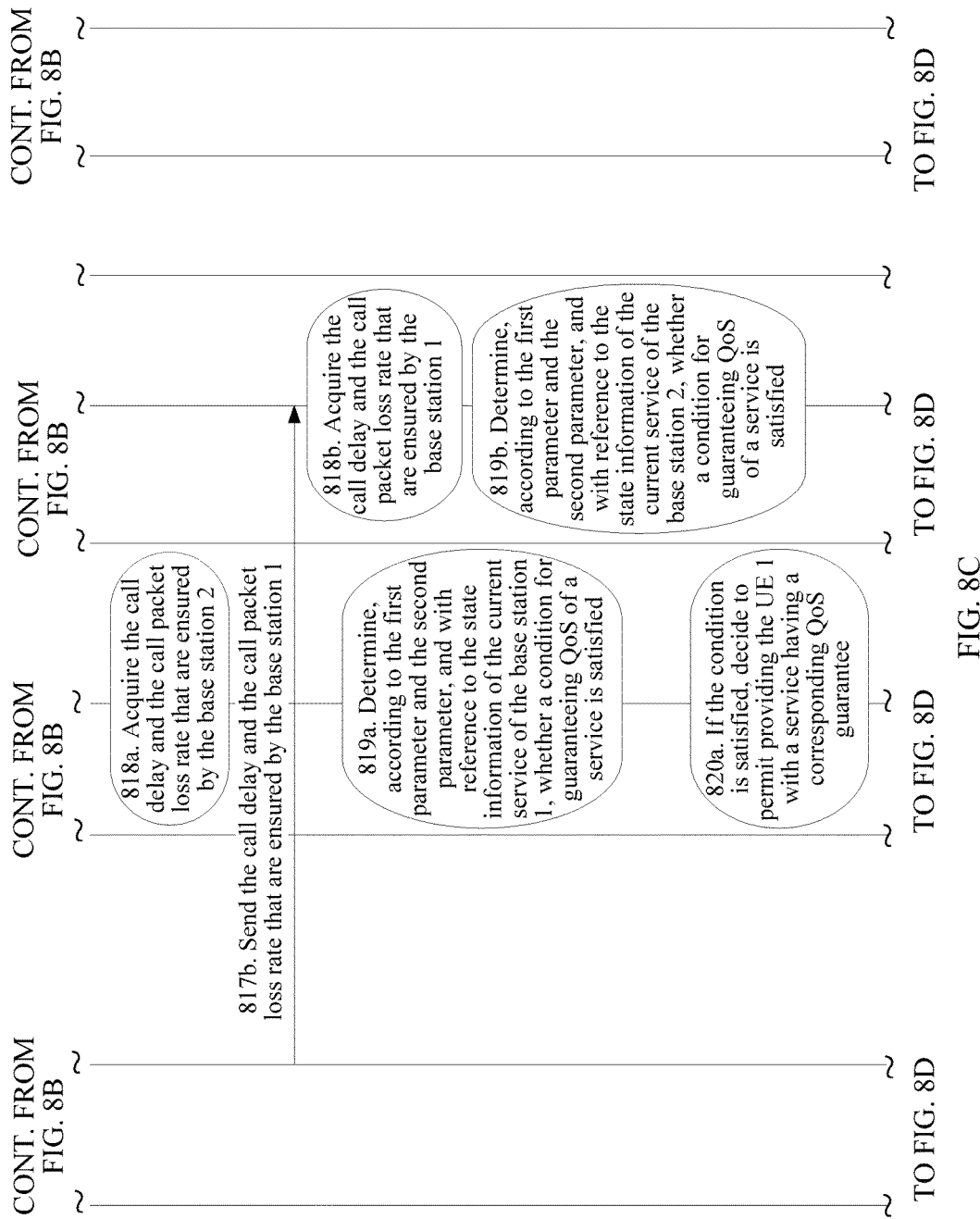

WIRELESS COMMUNICATIONS METHOD, WIRED TRANSMISSION DETECTION METHOD, AND RELATED DEVICE AND SYSTEM

CROSS-REFERENCE TO RELATED APPLICATION

This application is a continuation of International Application No. PCT/CN2014/072470, filed on Feb. 24, 2014, which claims priority to Chinese Patent Application No. 201310311794.9, filed on Jul. 23, 2013, both of which are hereby incorporated by reference in their entireties.

TECHNICAL FIELD

The present disclosure relates to the field of communications, and in particular, to a wireless communications method, a wired transmission detection method, and a related device.

BACKGROUND

With development of wireless communications technologies, people's requirements on quality of service (QoS) of wireless communication are becoming higher. To provide different QoS, a Long Term Evolution (LTE) system maps different services to different tunnels, to implement different processing.

Several QoS characteristics are defined for the LTE system, where the QoS characteristics characterize upper limits for time delays of transmission of different types of user equipment data packets between a user equipment (UE) and a policy and charging enforcement function (PCEF) entity or policy and charging rules function (PCRF) entity. However, quality of service sensed by the UE is actually end-to-end experience. No matter how short a transmission delay between a UE and a PCRF entity is, if a transmission delay between a server and a packet data gateway (PGW) is excessively long, unsatisfactory experience of the UE is still caused. In addition, different from a previous second-generation wireless communications system, the LTE system supports only a packet-switched (PS) connection, and no longer supports a circuit-switched (CS) connection. However, no resource is reserved for the PS connection, and therefore, during implementation in an actual system, the transmission delay between the UE and the PCEF or PCRF entity cannot be guaranteed, and then QoS in a wireless communications process cannot be guaranteed.

The prior art provides a method for improving call quality during a bidirectional call. In this method, an information flow of a call is examined in a call process, such that at least one interaction characteristic of the call process is monitored, and then characteristics of a specific interaction characteristic are detected. A maximum end-to-end delay is determined according to the detected characteristics of the interaction characteristic, and the maximum end-to-end delay is introduced into the call; and on the premise that a delay permits, an operation for improving call quality is added, for example, forward error correction coding/decoding, and then call experience can be improved.

However, similar to a QoS characteristic defined for the LTE system, this method cannot ensure an end-to-end delay. In addition, in this method, an interaction characteristic of a call is monitored after the call starts, and therefore, adjustment of a call delay is merely adjustment in a small range. If a transmission network has a problem of poor transmission quality during call connection, this method cannot ensure quality of service either.

SUMMARY

Embodiments of the present disclosure provide a wireless communications method, a wired transmission detection method, and a related device, which can ensure an end-to-end delay in a wireless communications process, and improve quality of service in the wireless communications process.

To achieve the foregoing objective, the embodiments of the present disclosure use the following technical solutions.

According to a first aspect, a wireless communications method is provided, where the method includes acquiring, by a PCRF entity, a first parameter, where the first parameter is a performance parameter of QoS of a first service requested by a current UE; acquiring a second parameter, where the second parameter is a transmission characteristic parameter that characterizes wired transmission of the first service; acquiring state information of a current service of a base station; determining, according to the first parameter, the second parameter, and the state information of the current service of the base station, whether a condition for guaranteeing QoS of a service is satisfied, where the service includes the first service and the current service of the base station; and if it is determined that the condition for guaranteeing the QoS of the service is satisfied, permitting providing the UE with the first service having a corresponding QoS guarantee; or if it is determined that the condition for guaranteeing the QoS of the service is not satisfied, executing a first operation.

In a first possible implementation manner of the first aspect, with reference to the first aspect, the acquiring a second parameter includes requesting, by sending a first request message to another network node, to acquire the second parameter; or acquiring the second parameter by reading stored record data of the second parameter.

In a second possible implementation manner of the first aspect, with reference to the first aspect or the first possible implementation manner of the first aspect, the acquiring state information of a current service of a base station includes requesting, by sending a second request message to the base station, to acquire the state information of the current service of the base station; or acquiring the state information of the current service of the base station by reading stored record data of service state information of the base station.

In a third possible implementation manner of the first aspect, with reference to the first aspect or the first possible implementation manner of the first aspect or the second possible implementation manner of the first aspect, the executing a first operation includes sending a third request message to a server, to request to re-determine the first parameter; acquiring a first parameter re-determined by the server; and determining, according to the re-determined first parameter and the second parameter, and with reference to the state information of the current service of the base station, whether the condition for guaranteeing the QoS of the service is satisfied, until it is determined that the condition for guaranteeing the QoS of the service is satisfied; or the executing a first operation includes rejecting establishing a connection to the first service.

In a fourth possible implementation manner of the first aspect, with reference to the first aspect to the third possible implementation manner of the first aspect, the first parameter includes at least one of the following: an end-to-end delay, an end-to-end packet loss rate, and a future network transmission rate.

In a fifth possible implementation manner of the first aspect, with reference to the fourth possible implementation manner of the first aspect, the determining, according to the first parameter, the second parameter, and the state information of the current service of the base station, whether a condition for guaranteeing QoS of a service is satisfied includes acquiring a maximum air interface transmission delay and a maximum packet loss rate according to the first parameter and the second parameter; and if it is determined, according to the maximum air interface transmission delay and the state information of the current service of the base station, that a condition for guaranteeing an air interface transmission delay of the first service is satisfied, and if it is determined, according to the maximum packet loss rate and the state information of the current service of the base station, that a condition for guaranteeing a maximum packet loss rate of the first service is satisfied, determining that the condition for guaranteeing the QoS of the service is satisfied.

In a sixth possible implementation manner of the first aspect, with reference to the fifth possible implementation manner of the first aspect, the determining, according to the maximum air interface transmission delay and the state information of the current service of the base station, that a condition for guaranteeing an air interface transmission delay of the first service is satisfied includes calculating, according to the maximum air interface transmission delay and with reference to the state information of the current service of the base station, a first bandwidth required by the maximum air interface transmission delay of the first service; adding the first bandwidth to a maximum bandwidth required by the current service of the base station, to acquire a second bandwidth; and if the second bandwidth does not exceed a bandwidth of a frequency band of the base station, determining that the condition for guaranteeing the air interface transmission delay of the first service is satisfied.

In a seventh possible implementation manner of the first aspect, with reference to the sixth possible implementation manner of the first aspect, the state information of the current service of the base station includes a correspondence between transmission delays and average scheduling spectral efficiency; and the calculating, according to the maximum air interface transmission delay and with reference to the state information of the current service of the base station, a first bandwidth required by the maximum air interface transmission delay includes determining, according to the maximum air interface transmission delay and the correspondence between transmission delays and average scheduling spectral efficiency, average scheduling spectral efficiency corresponding to the maximum air interface transmission delay; and calculating, according to the average scheduling spectral efficiency and a parameter of the future network transmission rate, the first bandwidth required by the maximum air interface transmission delay.

In an eighth possible implementation manner of the first aspect, with reference to the fifth possible implementation manner of the first aspect to the seventh possible implementation manner of the first aspect, the first service is a unidirectional downloading service; and the acquiring a maximum air interface transmission delay and a maximum packet loss rate according to the first parameter and the second parameter includes calculating a first wired transmission delay and a first wired transmission packet loss rate according to the second parameter, where the first wired transmission delay is a delay of wired transmission from the server to the base station, and the first wired transmission packet loss rate is a packet loss rate of the wired transmission from the server to the base station; subtracting the first wired transmission delay from the end-to-end delay in the first parameter, to acquire the maximum air interface transmission delay; and subtracting the first wired transmission packet loss rate from the end-to-end packet loss rate in the first parameter, to acquire the maximum packet loss rate.

In a ninth possible implementation manner of the first aspect, with reference to the eighth possible implementation manner of the first aspect, the second parameter includes a transmission characteristic parameter of the base station to the server; or a transmission characteristic parameter of a PGW to the server and a transmission characteristic parameter of the PGW to the base station.

In a tenth possible implementation manner of the first aspect, with reference to the ninth possible implementation manner of the first aspect, the transmission characteristic parameter of the PGW to the base station includes a transmission characteristic parameter of a first path from the PGW to the base station, where the first path is determined by the PGW according to the transmission characteristic parameter of the PGW to the server, and the end-to-end delay and the end-to-end packet loss rate in the first parameter.

In an eleventh possible implementation manner of the first aspect, with reference to the eighth possible implementation manner of the first aspect to the tenth possible implementation manner of the first aspect, the future network transmission rate includes at least one of the following: a maximum transmission rate, an average transmission rate, a mean square error of transmission rate variations, and time correlation of transmission rate variations.

In a twelfth possible implementation manner of the first aspect, with reference to the fifth possible implementation manner of the first aspect to the seventh possible implementation manner of the first aspect, the first service is a bidirectional call service; before the acquiring a maximum air interface transmission delay and a maximum packet loss rate according to the first parameter and the second parameter, the method further includes acquiring a call delay and a call packet loss rate that are guaranteed by a peer base station of the base station; and the acquiring a maximum air interface transmission delay and a maximum packet loss rate according to the first parameter and the second parameter includes calculating a first wired transmission delay and a first wired transmission packet loss rate according to the second parameter, where the first wired transmission delay is a delay of wired transmission from the current base station to the peer base station, and the first wired transmission packet loss rate is a packet loss rate of the wired transmission from the current base station to the peer base station; subtracting a sum of the first wired transmission delay and the call delay guaranteed by the peer base station from the end-to-end delay in the first parameter, to acquire the maximum air interface transmission delay; and subtracting a sum of the first wired transmission packet loss rate and the call packet loss rate guaranteed by the peer base station from the end-to-end packet loss rate in the first parameter, to acquire the maximum packet loss rate.

In a thirteenth possible implementation manner of the first aspect, with reference to the twelfth possible implementation manner of the first aspect, the second parameter includes a transmission characteristic parameter of the current base station to the peer base station.

In a fourteenth possible implementation manner of the first aspect, with reference to the twelfth possible implementation manner of the first aspect or the thirteenth possible implementation manner of the first aspect, the future network transmission rate includes at least one of the following: a maximum voice transmission rate and a voice activity factor.

In a fifteenth possible implementation manner of the first aspect, with reference to the first aspect to the fourteenth possible implementation manner of the first aspect, the transmission characteristic parameter includes at least one of the following: an average transmission delay, a transmission delay mean square error, and an average transmission packet loss rate.

In a sixteenth possible implementation manner of the first aspect, with reference to the first aspect to the fifteenth possible implementation manner of the first aspect, if it is determined that the condition for guaranteeing the QoS of the service is satisfied, the method further includes determining a corresponding charging standard according to the performance parameter of the QoS of the first service.

According to a second aspect, a wired transmission detection method is provided, where the method includes receiving, by a wired transmission detection apparatus, a first request message, where the first request message requests to acquire a third parameter, the third parameter is a transmission characteristic parameter of the wired transmission detection apparatus to a first network node, and the first request message carries an identifier of the first network node; indexing a prestored serving node transmission performance record table according to the identifier of the first network node, to determine whether the third parameter exists, where the serving node transmission performance record table records a transmission characteristic parameter of the wired transmission detection apparatus to each serving node, and the serving node is a network node that has been detected by the wired transmission detection apparatus; and if it is determined that the third parameter exists, sending the third parameter; or if it is determined that the third parameter does not exist, performing detection of the third parameter, and sending the third parameter.

In a first possible implementation manner of the second aspect, with reference to the second aspect, the serving node transmission performance record table records a transmission characteristic parameter at a first moment that is corresponding to a first serving node; and the method further includes performing detection of a transmission characteristic parameter at a second moment that is corresponding to the first serving node; and if a deviation between the transmission characteristic parameter at the first moment and the transmission characteristic parameter at the second moment is greater than a first threshold, sending a first instruction message to a PCRF entity, where the first instruction message instructs the PCRF entity to acquire a first parameter again, and the first parameter is a performance parameter of QoS of a first service requested by a current UE.

In a second possible implementation manner of the second aspect, with reference to the second aspect or the first possible implementation manner of the second aspect, the first network node is a server, and the wired transmission detection apparatus is deployed in a base station; and the third parameter includes a transmission characteristic parameter of the base station to the server;

In a third possible implementation manner of the second aspect, with reference to the second aspect or the first possible implementation manner of the second aspect, the first network node is a server, and the wired transmission detection apparatus is deployed in a PGW; and the third parameter includes a transmission characteristic parameter of the PGW to the server.

In a fourth possible implementation manner of the second aspect, with reference to the second aspect or the first possible implementation manner of the second aspect, the first network node is a second base station, and the wired transmission detection apparatus is deployed in a first base station; and the third parameter includes a transmission characteristic parameter of the first base station to the second base station.

In a fifth possible implementation manner of the second aspect, with reference to the second aspect to the fourth possible implementation manner of the second aspect, the transmission characteristic parameter includes at least one of the following: an average transmission delay, a transmission delay mean square error, and an average transmission packet loss rate.

In a sixth possible implementation manner of the second aspect, with reference to the first possible implementation manner of the second aspect to the fifth possible implementation manner of the second aspect, the first parameter includes at least one of the following: an end-to-end delay, an end-to-end packet loss rate, and a future network transmission rate.

According to a third aspect, a PCRF entity is provided, where the PCRF entity includes an acquiring unit, a determining unit, a decision unit, and an execution unit, where the acquiring unit is configured to acquire a first parameter, and send the first parameter to the determining unit, where the first parameter is a performance parameter of QoS of a first service requested by a current UE; acquire a second parameter, and send the second parameter to the determining unit, where the second parameter is a transmission characteristic parameter that characterizes wired transmission of the first service; and acquire state information of a current service of a base station, and send the state information of the current service of the base station to the determining unit; the determining unit is configured to determine, according to the first parameter, the second parameter, and the state information of the current service of the base station that are acquired by the acquiring unit, whether a condition for guaranteeing QoS of a service is satisfied, where the service includes the first service and the current service of the base station; the decision unit is configured to decide, when the determining unit determines that the condition for guaranteeing the QoS of the service is satisfied, to permit providing the UE with the first service having a corresponding QoS guarantee; and the execution unit is configured to execute a first operation when the determining unit determines that the condition for guaranteeing the QoS of the service is not satisfied.

In a first possible implementation manner of the third aspect, with reference to the third aspect, the PCRF entity further includes a sending unit or a reading unit; and the acquiring unit is configured to request, using the sending unit to send a first request message to another network node, to acquire the second parameter; or acquire the second parameter using the reading unit to read stored record data of the second parameter.

In a second possible implementation manner of the third aspect, with reference to the third aspect or the first possible implementation manner of the third aspect, the PCRF entity further includes a sending unit or a reading unit; and the acquiring unit is configured to request, using the sending unit to send a second request message to the base station, to acquire the state information of the current service of the base station; or acquire the state information of the current service of the base station using the reading unit to read stored record data of the state information of the current service of the base station.

In a third possible implementation manner of the third aspect, with reference to the third aspect or the first possible implementation manner of the third aspect or the second possible implementation manner of the third aspect, the execution unit is configured to send a third request message to a server, to request to re-determine the first parameter; acquire a first parameter re-determined by the server; and determine, according to the re-determined first parameter and the second parameter, and with reference to the state information of the current service of the base station, whether the condition for guaranteeing the QoS of the service is satisfied, until it is determined that the condition for guaranteeing the QoS of the service is satisfied; or the execution unit is configured to reject establishing a connection to the first service.

In a fourth possible implementation manner of the third aspect, with reference to the third aspect to the third possible implementation manner of the third aspect, the first parameter includes at least one of the following: an end-to-end delay, an end-to-end packet loss rate, and a future network transmission rate.

In a fifth possible implementation manner of the third aspect, with reference to the fourth possible implementation manner of the third aspect, the determining unit includes an acquiring module, a first determining module, a second determining module, and a third determining module, where the acquiring module is configured to acquire a maximum air interface transmission delay and a maximum packet loss rate according to the first parameter and the second parameter; the first determining module is configured to determine, according to the maximum air interface transmission delay acquired by the acquiring module and the state information of the current service of the base station acquired by the acquiring unit, whether a condition for guaranteeing an air interface transmission delay of the first service is satisfied; the second determining module is configured to determine, according to the maximum packet loss rate acquired by the acquiring module and the state information of the current service of the base station acquired by the acquiring unit, whether a condition for guaranteeing a maximum packet loss rate of the first service is satisfied; and the third determining module is configured to, when the first determining module determines that the condition for guaranteeing the air interface transmission delay of the first service is satisfied, and the second determining module determines that the condition for guaranteeing the maximum packet loss rate of the first service is satisfied, determine that the condition for guaranteeing the QoS of the service is satisfied.

In a sixth possible implementation manner of the third aspect, with reference to the fifth possible implementation manner of the third aspect, the first determining module includes a first calculating submodule, a first acquiring submodule, and a first determining submodule, where the first calculating submodule is configured to calculate, according to the maximum air interface transmission delay and with reference to the state information of the current service of the base station, a first bandwidth required by the maximum air interface transmission delay of the first service; the first acquiring submodule is configured to add the first bandwidth obtained by means of the calculation by the first calculating submodule to a maximum bandwidth required by the current service of the base station, to acquire a second bandwidth; and the first determining submodule is configured to, if the second bandwidth does not exceed a bandwidth of a frequency band of the base station, determine that the condition for guaranteeing the air interface transmission delay of the first service is satisfied.

In a seventh possible implementation manner of the third aspect, with reference to the sixth possible implementation manner of the third aspect, the state information of the current service of the base station includes a correspondence between transmission delays and average scheduling spectral efficiency; and the first calculating submodule is configured to determine, according to the maximum air interface transmission delay and the correspondence between transmission delays and average scheduling spectral efficiency, average scheduling spectral efficiency corresponding to the maximum air interface transmission delay; and calculate, according to the average scheduling spectral efficiency and a parameter of the future network transmission rate, the first bandwidth required by the maximum air interface transmission delay.

In an eighth possible implementation manner of the third aspect, with reference to the fifth possible implementation manner of the third aspect to the seventh possible implementation manner of the third aspect, the first service is a unidirectional downloading service; and the acquiring module is configured to calculate a first wired transmission delay and a first wired transmission packet loss rate according to the second parameter, where the first wired transmission delay is a delay of wired transmission from the server to the base station, and the first wired transmission packet loss rate is a packet loss rate of the wired transmission from the server to the base station; subtract the first wired transmission delay from the end-to-end delay in the first parameter, to acquire the maximum air interface transmission delay; and subtract the first wired transmission packet loss rate from the end-to-end packet loss rate in the first parameter, to acquire the maximum packet loss rate.

In a ninth possible implementation manner of the third aspect, with reference to the eighth possible implementation manner of the third aspect, the second parameter includes a transmission characteristic parameter of the base station to the server; or a transmission characteristic parameter of a PGW to the server and a transmission characteristic parameter of the PGW to the base station.

In a tenth possible implementation manner of the third aspect, with reference to the ninth possible implementation manner of the third aspect, the transmission characteristic parameter of the PGW to the base station includes a transmission characteristic parameter of a first path from the PGW to the base station, where the first path is determined by the PGW according to the transmission characteristic parameter of the PGW to the server, and the end-to-end delay and the end-to-end packet loss rate in the first parameter.

In an eleventh possible implementation manner of the third aspect, with reference to the eighth possible implementation manner of the third aspect to the tenth possible implementation manner of the third aspect, the future network transmission rate includes at least one of the following: a maximum transmission rate, an average transmission rate, a mean square error of transmission rate variations, and time correlation of transmission rate variations.

In a twelfth possible implementation manner of the third aspect, with reference to the fifth possible implementation manner of the third aspect to the seventh possible implementation manner of the third aspect, the first service is a bidirectional call service; the acquiring unit is further configured to acquire a call delay and a call packet loss rate that are guaranteed by a peer base station of the base station; and the acquiring module is configured to calculate a first wired transmission delay and a first wired transmission packet loss rate according to the second parameter, where the first wired transmission delay is a delay of wired transmission from the current base station to the peer base station, and the first wired transmission packet loss rate is a packet loss rate of the wired transmission from the current base station to the peer base station; subtract a sum of the first wired transmission delay and the call delay guaranteed by the peer base station from the end-to-end delay in the first parameter, to acquire the maximum air interface transmission delay; and subtract a sum of the first wired transmission packet loss rate and the call packet loss rate guaranteed by the peer base station from the end-to-end packet loss rate in the first parameter, to acquire the maximum packet loss rate.

In a thirteenth possible implementation manner of the third aspect, with reference to the twelfth possible implementation manner of the third aspect, the second parameter includes a transmission characteristic parameter of the current base station to the peer base station.

In a fourteenth possible implementation manner of the third aspect, with reference to the twelfth possible implementation manner of the third aspect or the thirteenth possible implementation manner of the third aspect, the future network transmission rate includes at least one of the following: a maximum voice transmission rate and a voice activity factor.

In a fifteenth possible implementation manner of the third aspect, with reference to the third aspect to the fourteenth possible implementation manner of the third aspect, the transmission characteristic parameter includes at least one of the following: an average transmission delay, a transmission delay mean square error, and an average transmission packet loss rate.

In a sixteenth possible implementation manner of the third aspect, with reference to the third aspect to the fifteenth possible implementation manner of the third aspect, the acquiring unit is further configured to determine a corresponding charging standard according to the performance parameter of the QoS of the first service.

According to a fourth aspect, a wired transmission detection apparatus is provided, where the wired transmission detection apparatus includes a receiving unit, a serving node indexing unit, a serving node transmission performance record table, a transmission performance detection unit, and a sending unit, where the receiving unit is configured to receive a first request message, where the first request message requests to acquire a third parameter, the third parameter is a transmission characteristic parameter of the wired transmission detection apparatus to a first network node, and the first request message carries an identifier of the first network node; the serving node indexing unit is configured to index a prestored serving node transmission performance record table according to the identifier of the first network node received by the receiving unit, to determine whether the third parameter exists, where the serving node transmission performance record table records a transmission characteristic parameter of the wired transmission detection apparatus to each serving node, and the serving node is a network node that has been detected by the wired transmission detection apparatus; the transmission performance detection unit is configured to perform detection of the third parameter when the serving node indexing unit determines that the third parameter does not exist; and the sending unit is configured to send the third parameter determined by the serving node indexing unit or the third parameter detected by the transmission performance detection unit.

In a first possible implementation manner of the fourth aspect, with reference to the fourth aspect, the serving node transmission performance record table records a transmission characteristic parameter at a first moment that is corresponding to a first serving node; the transmission performance detection unit is further configured to perform detection of a transmission characteristic parameter at a second moment that is corresponding to the first serving node; and the sending unit is further configured to, if a deviation between the transmission characteristic parameter at the first moment and the transmission characteristic parameter at the second moment is greater than a first threshold, send a first instruction message to a PCRF entity, where the first instruction message instructs the PCRF entity to acquire a first parameter again, and the first parameter is a performance parameter of QoS of a first service requested by a current UE.

In a second possible implementation manner of the fourth aspect, with reference to the fourth aspect or the first possible implementation manner of the fourth aspect, the first network node is a server, and the wired transmission detection apparatus is deployed in a base station; and the third parameter includes a transmission characteristic parameter of the base station to the server.

In a third possible implementation manner of the fourth aspect, with reference to the fourth aspect or the first possible implementation manner of the fourth aspect, the first network node is a server, and the wired transmission detection apparatus is deployed in a PGW; and the third parameter includes a transmission characteristic parameter of the PGW to the server.

In a fourth possible implementation manner of the fourth aspect, with reference to the fourth aspect or the first possible implementation manner of the fourth aspect, the first network node is a second base station, and the wired transmission detection apparatus is deployed in a first base station; and the third parameter includes a transmission characteristic parameter of the first base station to the second base station.

In a fifth possible implementation manner of the fourth aspect, with reference to the fourth aspect to the fourth possible implementation manner of the fourth aspect, the transmission characteristic parameter includes at least one of the following: an average transmission delay, a transmission delay mean square error, and an average transmission packet loss rate.

In a sixth possible implementation manner of the fourth aspect, with reference to the first possible implementation manner of the fourth aspect to the fifth possible implementation manner of the fourth aspect, the first parameter includes at least one of the following: an end-to-end delay, an end-to-end packet loss rate, and a future network transmission rate.

According to a fifth aspect, a wireless communications system is provided, where the system includes the PCRF entity according to any possible implementation manner of the third aspect, the wired transmission detection apparatus according to any possible implementation manner of the fourth aspect, an Internet Protocol (IP) multimedia subsystem (IMS), a base station, a PGW, a serving gateway (SGW), a server, and a UE.

According to a sixth aspect, a wireless communications system is provided, where the system includes a first PCRF entity, a second PCRF entity, a first wired transmission detection apparatus, a second wired transmission detection apparatus, a first base station, a second base station, a first PGW, a second PGW, a first SGW, a second SGW, a first UE, a second UE, and a server, where the first/second PCRF entity is the PCRF entity according to any possible implementation manner of the third aspect, and the first/second wired transmission detection apparatus is the wired transmission detection apparatus according to any possible implementation manner of the fourth aspect.

The embodiments of the present disclosure provide a wireless communications method, apparatus, and system. The method includes acquiring, by a PCRF entity, a first parameter, a second parameter, and state information of a current service of a base station, where the first parameter is a performance parameter of QoS of a first service requested by a current UE, and the second parameter is a transmission characteristic parameter that characterizes wired transmission of the first service; determining, according to the first parameter, the second parameter, and the state information of the current service of the base station, whether a condition for guaranteeing QoS of a service is satisfied; and if it is determined that the condition for guaranteeing the QoS of the service is satisfied, permitting providing the UE with the first service having a corresponding QoS guarantee; or if it is determined that the condition for guaranteeing the QoS of the service is not satisfied, executing a first operation. Using the method, an end-to-end delay in a wireless communications process can be guaranteed, and quality of service in the wireless communications process can be improved.

BRIEF DESCRIPTION OF DRAWINGS

FIG. 8A, FIG. 8B, FIG. 8C and FIG. 8D are another wireless communications method according to an embodiment of the present disclosure;

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Embodiment 1

Figure 1:
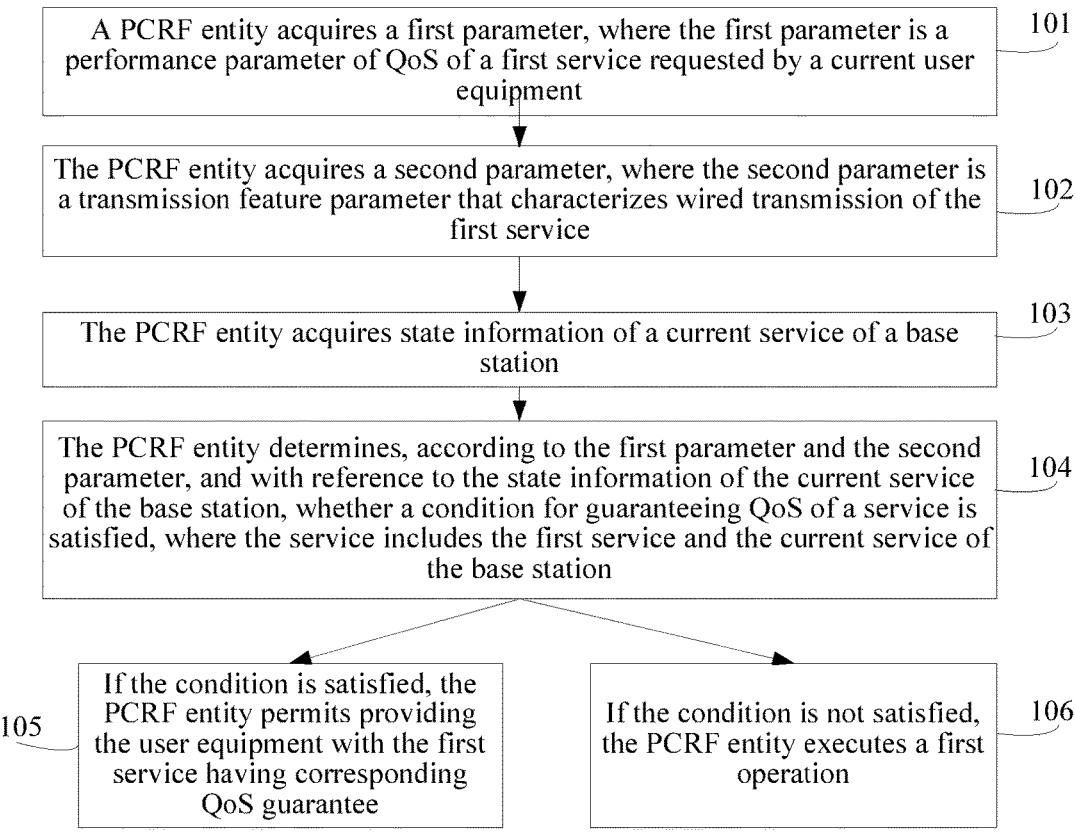
FIG. 1 is a wireless communications method according to an embodiment of the present disclosure.

This embodiment of the present disclosure provides a wireless communications method, where the method is applied to a policy and charging rules function (PCRF) entity. As shown in FIG. 1, the method includes the following steps.

101: A PCRF entity acquires a first parameter, where the first parameter is a performance parameter of QoS of a first service requested by a current UE.

When the UE requests the first service from a server, the server may obtain by means of abstraction, according to a request message for the first service, a necessary statistical parameter, that is, the first parameter, required for ensuring the QoS of the first service, where the first parameter may include at least one of the following: an end-to-end delay, an end-to-end packet loss rate, and a future network transmission rate, and then the server sends the first parameter to the PCRF entity, such that the PCRF entity acquires the first parameter.

When the service is a unidirectional downloading service, the future network transmission rate may include at least one of the following: a maximum transmission rate, an average transmission rate, a mean square error of transmission rate variations, and time correlation of transmission rate variations.

When the service is a bidirectional call service, the future network transmission rate may include at least one of the following: a maximum voice transmission rate and a voice activity factor.

A parameter that characterizes the future network transmission rate is not limited to the foregoing parameter, and is not specifically limited in this embodiment of the present disclosure.

102: The PCRF entity acquires a second parameter, where the second parameter is a transmission characteristic parameter that characterizes wired transmission of the first service.

Because the end-to-end delay and the end-to-end packet loss rate for estimating the QoS of the service are also affected by external transmission characteristics, before it is determined that QoS of the UE can be satisfied, the transmission characteristic parameter of wired transmission of the first service further needs to be acquired.

When the first service is a unidirectional downloading service, the transmission characteristic parameter of wired transmission of the first service is a transmission characteristic parameter of a base station to the server.

When the first service is a bidirectional call service, the transmission characteristic parameter of wired transmission of the first service is a transmission characteristic parameter of a current base station to a peer base station.

All of the second parameter may be obtained by means of detection by a wired transmission detection apparatus, or some of the second parameter may be obtained by means of detection by a wired transmission detection apparatus, which is not specifically limited in this embodiment of the present disclosure, and is related to a deployment location of the wired transmission detection apparatus.

Exemplarily, when the first service is a unidirectional downloading service, if the wired transmission detection apparatus is deployed in the base station, the transmission characteristic parameter of the base station to the server can be detected using only the wired transmission detection apparatus; or if the wired transmission detection apparatus is deployed in a PGW, the wired transmission detection apparatus performs detection of only a transmission characteristic parameter of the PGW to the server, while a transmission characteristic parameter of the PGW to the base station may be acquired by means of detection by a detection unit in another network node.

The second parameter may be acquired by sending a first request message to another network node, or may be acquired by reading a stored record of the second parameter that is monitored in real time, which is not specifically limited in this embodiment of the present disclosure. When the first service is a unidirectional downloading service, the other network node may be a PGW, a base station, or the like; or when the first service is a bidirectional call service, the other network node may be a first/second base station, which is not specifically limited in this embodiment of the present disclosure.

103: The PCRF entity acquires state information of a current service of a base station.

In a process of determining whether the first service can obtain admission, the PCRF entity further needs to acquire the state information of the current service of the base station. For example, a table of a relationship between transmission delays and scheduling efficiency created according to a state of the current service of the base station is shown in Table 1.

TABLE 1

| Scheduling Algorithm | Delay Restriction | Average User Channel Condition | Average Scheduling Spectral Efficiency |
|---|---|---|---|
| Proportional fair scheduling | 1500 ms | 0 dB | 1.106 b/s/Hz |
| Proportional fair scheduling | 3000 ms | 0 dB | 1.14 b/s/Hz |
| Proportional fair scheduling | 100 ms | 0 dB | 0.93 b/s/Hz |

It should be noted that, the acquiring a first parameter in step 101, the acquiring a second parameter in step 102, and the acquiring state information of a current service of a base station in step 103 do not have a definite sequence. The first parameter may be acquired first, or the second parameter may be acquired first, or the state information of the current service of the base station may be acquired first, which is not specifically limited in this embodiment of the present disclosure.

The state information of the current service of the base station may be acquired by sending a second request message to the base station, or may be acquired by reading a record of service state information of the base station that is monitored in real time, which is not specifically limited in this embodiment of the present disclosure.

104: The PCRF entity determines, according to the first parameter, the second parameter, and the state information of the current service of the base station, whether a condition for guaranteeing QoS of a service is satisfied, where the service includes the first service and the current service of the base station, and when it is determined that the condition for guaranteeing the QoS of the service is satisfied, go to 105; or when it is determined that the condition for guaranteeing the QoS of the service is not satisfied, go to 106.

The determining, by the PCRF entity according to the first parameter, the second parameter, and the state information of the current service of the base station, whether a condition for guaranteeing QoS of a service is satisfied may include acquiring a maximum air interface transmission delay and a maximum packet loss rate according to the first parameter and the second parameter; and if it is determined, according to the maximum air interface transmission delay and the state information of the current service of the base station, that a condition for guaranteeing an air interface transmission delay of the first service is satisfied, and if it is determined, according to the maximum packet loss rate and the state information of the current service of the base station, that a condition for guaranteeing a maximum packet loss rate of the first service is satisfied, determining that the condition for guaranteeing the QoS of the service is satisfied.

The determining, according to the maximum air interface transmission delay and the state information of the current service of the base station, that a condition for guaranteeing an air interface transmission delay of the first service is satisfied may include calculating, according to the maximum air interface transmission delay and with reference to the state information of the current service of the base station, a first bandwidth required by the maximum air interface transmission delay of the first service; adding the first bandwidth to a maximum bandwidth required by the current service of the base station, to acquire a second bandwidth; and if the second bandwidth does not exceed a bandwidth of a frequency band of the base station, determining that the condition for guaranteeing the air interface transmission delay of the first service is satisfied.

The state information of the current service of the base station includes a correspondence between transmission delays and average scheduling spectral efficiency; and the calculating, according to the maximum air interface transmission delay and with reference to the state information of the current service of the base station, a first bandwidth required by the maximum air interface transmission delay may include determining, according to the maximum air interface transmission delay and the correspondence between transmission delays and average scheduling spectral efficiency, average scheduling spectral efficiency corresponding to the maximum air interface transmission delay; and calculating, according to the average scheduling spectral efficiency and a parameter of the future network transmission rate, the first bandwidth required by the maximum air interface transmission delay.

The determining, according to the maximum packet loss rate and the state information of the current service of the base station, that a condition for guaranteeing a maximum packet loss rate of the first service is satisfied may include determining a packet loss rate of the current service according to a size of a lost packet of the current service; and if the packet loss rate of the current service is not greater than the maximum packet loss rate, determining that the condition for guaranteeing the maximum packet loss rate of the first service is satisfied.

There may be another method for determining, according to the first parameter and the second parameter, and with reference to the state information of the current service of the base station, whether the condition for guaranteeing the QoS of the service is satisfied, which is not specifically limited in this embodiment of the present disclosure.

105: The PCRF entity permits providing the UE with the first service having a corresponding QoS guarantee.

More specifically, as an entity for deciding a service policy, the PCRF entity decides, after determining that the condition for guaranteeing the QoS of the service is satisfied, to permit providing the UE with the first service having a corresponding QoS guarantee.

It should be noted that, after the PCRF entity decides to permit providing the UE with the service having a corresponding QoS guarantee, the PCRF entity may configure performance parameters that are on network nodes, for example, configure, on the PGW and an SGW, parameters required by the QoS of the first service; or the PCRF entity may send the end-to-end delay and the end-to-end packet loss rate to the base station, to configure the base station. This embodiment of the present disclosure does not specifically limit a process of configuring the performance parameters that are on the network nodes.

106: The PCRF entity executes a first operation.

More specifically, in an embodiment of the present disclosure, the executing a first operation may include sending a third request message to a server, where the third request message requests to re-determine the first parameter; acquiring a first parameter re-determined by the server; and determining, according to the re-determined first parameter and the second parameter, and with reference to the state information of the current service of the base station, whether the condition for guaranteeing the QoS of the service is satisfied, until it is determined that the condition for guaranteeing the QoS of the service is satisfied and it is decided to permit providing the UE with the first service having a corresponding QoS guarantee, where the service includes the first service and the current service of the base station.

In another embodiment of the present disclosure, the executing a first operation includes rejecting establishing a connection to the first service.

Figure 2:
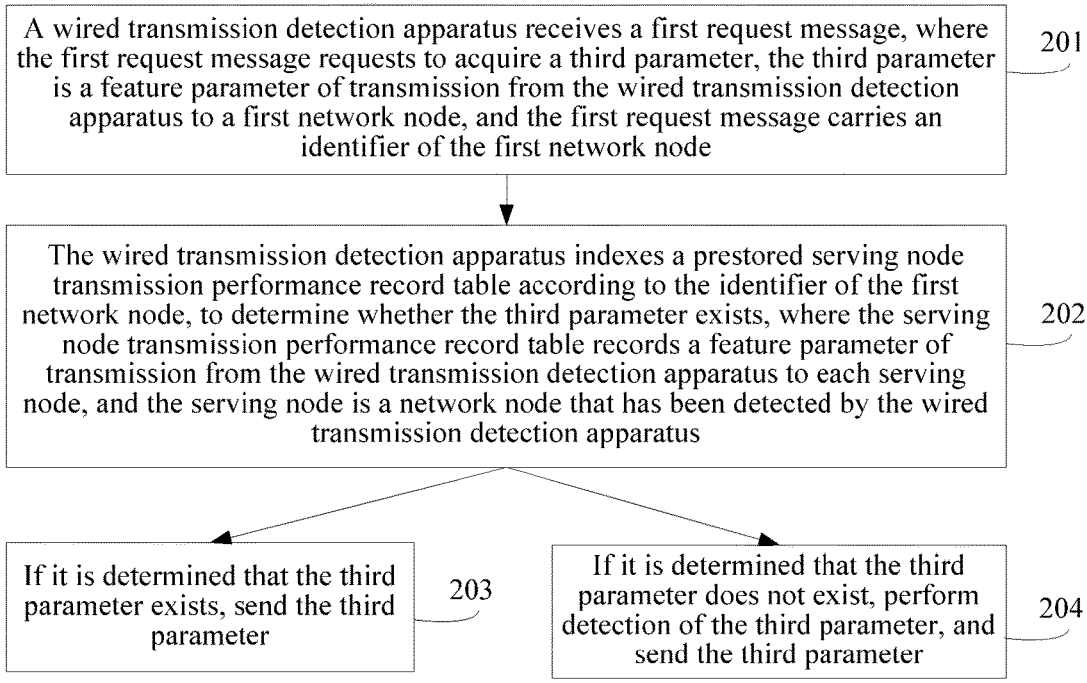
FIG. 2 is a wired transmission detection method according to an embodiment of the present disclosure.

This embodiment of the present disclosure further provides a wired transmission detection method, where the method is applied to a wired transmission detection apparatus. As shown in FIG. 2, the method includes the following steps.

201: A wired transmission detection apparatus receives a first request message, where the first request message requests to acquire a third parameter, the third parameter is a transmission characteristic parameter of the wired transmission detection apparatus to a first network node, and the first request message carries an identifier of the first network node.

More specifically, the wired transmission detection apparatus can detect a transmission characteristic parameter to the first network node, where the first network node may be a server, a PGW, an SGW, or the like, which is not specifically limited in this embodiment of the present disclosure.

The wired transmission detection apparatus may be deployed in a base station, or may be deployed in a PGW. A deployment location of the wired transmission detection apparatus is not specifically limited in this embodiment of the present disclosure either.

Exemplarily, if the first network node is a server, and the wired transmission detection apparatus is deployed in a base station, the third parameter is a transmission characteristic parameter of the base station to the server.

If the first network node is a server, and the wired transmission detection apparatus is deployed in a PGW, the third parameter is a transmission characteristic parameter of the PGW to the server.

In a case of a bidirectional call service, if the first network node is a second base station, and the wired transmission detection apparatus is deployed in a first base station, the third parameter is a transmission characteristic parameter of the first base station to the second base station.

The transmission characteristic parameter may include at least one of the following: an average transmission delay, a transmission delay mean square error, and an average transmission packet loss rate.

202: The wired transmission detection apparatus indexes a prestored serving node transmission performance record table according to the identifier of the first network node, to determine whether the third parameter exists, where the serving node transmission performance record table records a transmission characteristic parameter of the wired transmission detection apparatus to each serving node, and the serving node is a network node that has been detected by the wired transmission detection apparatus, and when it is determined that the third parameter exists, go to 203; or when it is determined that the third parameter does not exist, go to 204.

More specifically, the wired transmission detection apparatus includes a serving node transmission performance record table, where the serving node transmission performance record table may be various storage media, including a hard disk, a solid-state disk, a random access memory, a magnetic tape, and the like, which is not specifically limited in this embodiment of the present disclosure.

Assuming that the transmission characteristic parameter includes an average transmission delay, a transmission delay mean square error, and an average transmission packet loss rate, a serving node transmission performance record table is exemplarily provided herein, as shown in Table 2.

TABLE 2

| Serving Node Name | Average Transmission Delay | Transmission Delay Mean Square Error | Average Transmission Packet Loss Rate |
|---|---|---|---|
| Node 1 | Parameter | Parameter | Parameter |
| Node 2 | Parameter | Parameter | Parameter |
| Node 3 | Parameter | Parameter | Parameter |

It should be noted that the serving node transmission performance record table may also be presented in another form, which is not specifically limited in this embodiment of the present disclosure.

After detecting a transmission performance parameter of a network node, the wired transmission detection apparatus records the transmission performance parameter in the serving node transmission performance record table.

It should be noted that, if serving node list information already includes the network node, only the transmission performance parameter corresponding to the network node may be updated; or if the serving node list information does not include the network node, an identifier of the network node is recorded in the serving node list information, and then the transmission performance parameter is stored at a transmission performance list location corresponding to the network node.

203: If it is determined that the third parameter exists, send the third parameter.

Exemplarily, if the wired transmission detection apparatus is deployed in a base station, the first request message requests to acquire a transmission characteristic parameter to the server, and at this time, another UE served by the base station has sent a request to the server and has acquired a service of the server, a transmission characteristic parameter of the server to the base station can be found in the serving node transmission performance record table, and therefore, the wired transmission detection apparatus may directly send the third parameter to a network node that sends the first request message.

204: If it is determined that the third parameter does not exist, perform detection of the third parameter, and send the third parameter.

More specifically, if a serving node indexing unit included in the wired transmission detection apparatus does not find the identifier of the first network node in the serving node transmission performance record table by means of indexing, the serving node indexing unit starts a transmission performance detection unit to perform performance detection for the first network node.

The transmission performance detection unit may continuously send a ping instruction to the first network node for 100 times, to acquire a required transmission performance parameter. By averaging delays of all responded data packets and then dividing an average delay by 2, an average transmission delay can be obtained, and then a square error of delays can be obtained. In addition to the ping instruction, a traceroute instruction may be used to obtain a delay parameter, or an echo service of the server may be used to obtain measurement data of a delay by means of reflection, which is not specifically limited in this embodiment of the present disclosure. By counting data packets that are not responded, a value of the data packet rate can be obtained.

It should be noted that, after obtaining the transmission performance parameter of the first network node, the transmission performance detection unit may record the identifier of the first network node and the transmission performance parameter of the first network node in the serving node transmission performance record table, for a query next time, and send the transmission performance parameter to the network node that sends the first request message.

It should be noted that, in the present disclosure, the network node that sends the first request message is a PCRF entity, and therefore, the wired transmission detection apparatus sends the third parameter to the PCRF entity, such that the PCRF entity acquires the third parameter, and then determines whether the first service can obtain admission.

It should be noted that, in a wireless communications process, the wired transmission detection apparatus has a function of monitoring an external network transmission characteristic. Assuming that a transmission characteristic parameter at a first moment that is corresponding to a first serving node is recorded in the serving node transmission performance record table currently, after a transmission characteristic parameter at a second moment that is corresponding to the first serving node is detected at the second moment, if it is found by means of comparison that a deviation between transmission characteristics at the first moment and the second moment is relatively large, a condition for guaranteeing QoS of the first service may not be satisfied. Therefore, when the transmission characteristic parameter at the first moment that is corresponding to the first serving node is recorded in the serving node transmission performance record table, the method further includes performing, by the wired transmission detection apparatus, detection of the transmission characteristic parameter at the second moment that is corresponding to the first serving node; and if a deviation between the transmission characteristic parameter at the first moment and the transmission characteristic parameter at the second moment is greater than a first threshold, sending, by the wired transmission detection apparatus, a first instruction message to a PCRF entity, where the first instruction message instructs the PCRF entity to acquire a first parameter again, and the first parameter is a performance parameter of QoS of a first service requested by a current UE, and may include at least one of the following parameters: an end-to-end delay, an end-to-end packet loss rate, and a future network transmission rate.

Then, the PCRF entity restarts a process of negotiating the QoS of the first service.

This embodiment of the present disclosure provides a wireless communications method. The method includes acquiring, by a PCRF entity, a first parameter, a second parameter, and state information of a current service of a base station, where the first parameter is a performance parameter of QoS of a first service requested by a current UE, and the second parameter is a transmission characteristic parameter that characterizes wired transmission of the first service; determining, according to the first parameter, the second parameter, and the state information of the current service of the base station, whether a condition for guaranteeing QoS of a service is satisfied; and if it is determined that the condition for guaranteeing the QoS of the service is satisfied, permitting providing the UE with the first service having a corresponding QoS guarantee; or if it is determined that the condition for guaranteeing the QoS of the service is not satisfied, executing a first operation. Using the method, an end-to-end delay in a wireless communications process can be guaranteed, and quality of service in the wireless communications process can be improved.

Embodiment 2

Figure 3:
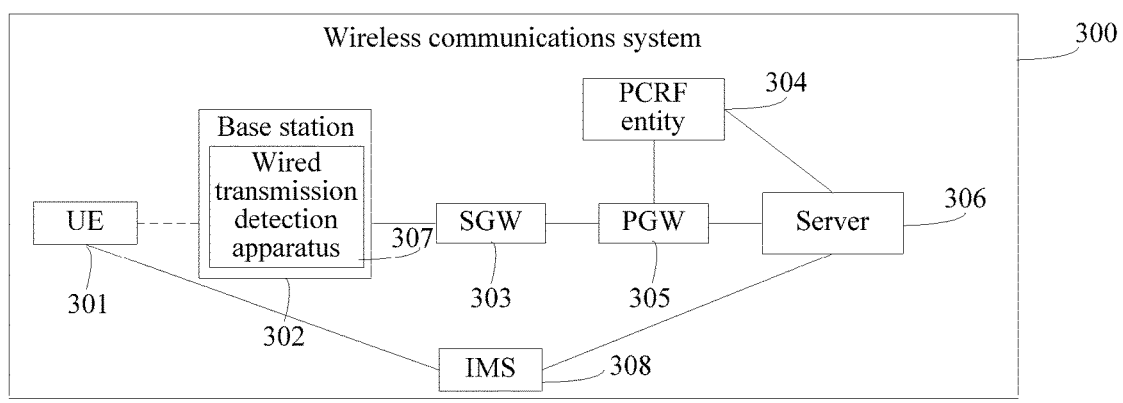
FIG. 3 is a wireless communications system according to an embodiment of the present disclosure.
Figure 4A:
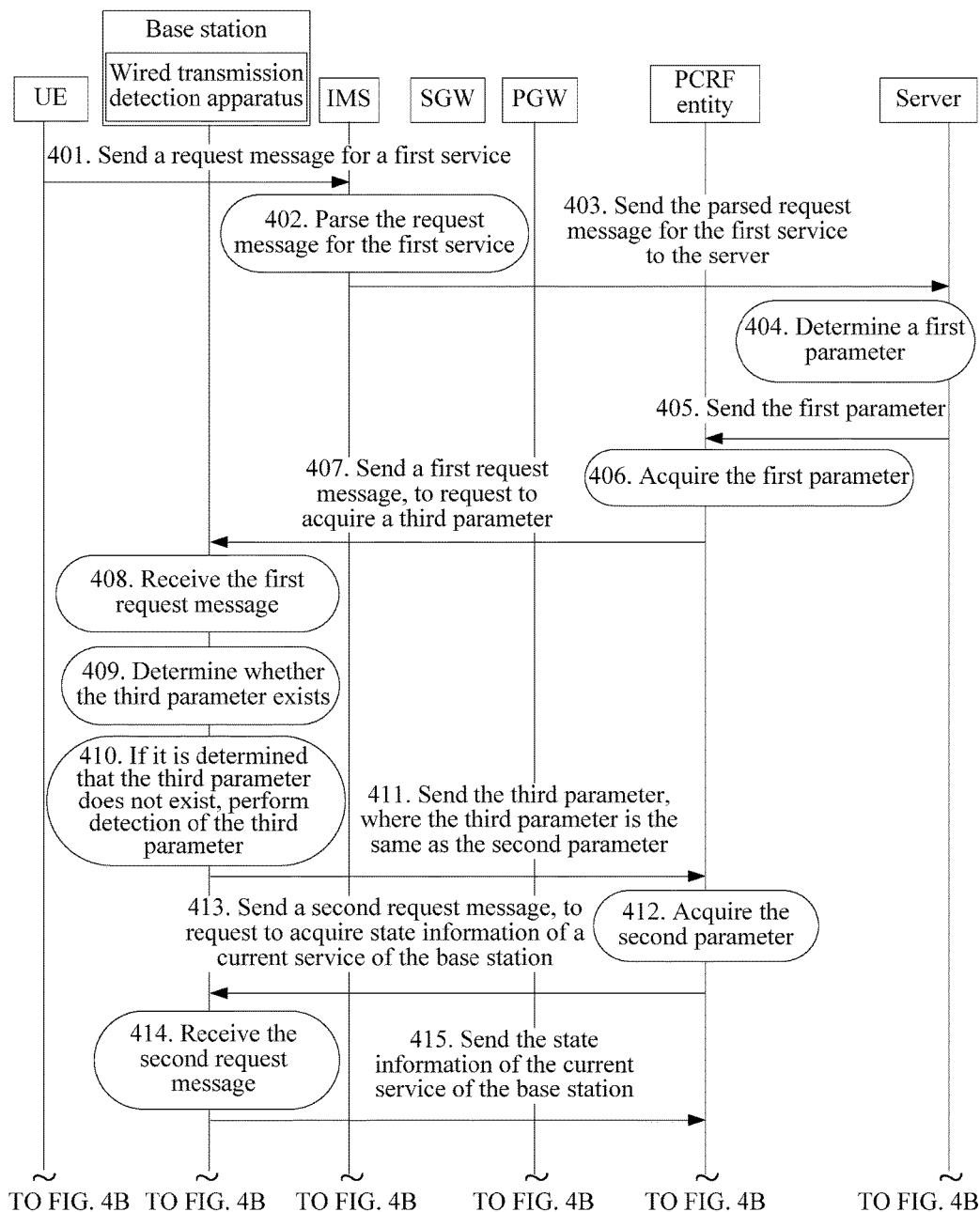
FIG. 4A and FIG. 4B are another wireless communications method according to an embodiment of the present disclosure.
Figure 4B:
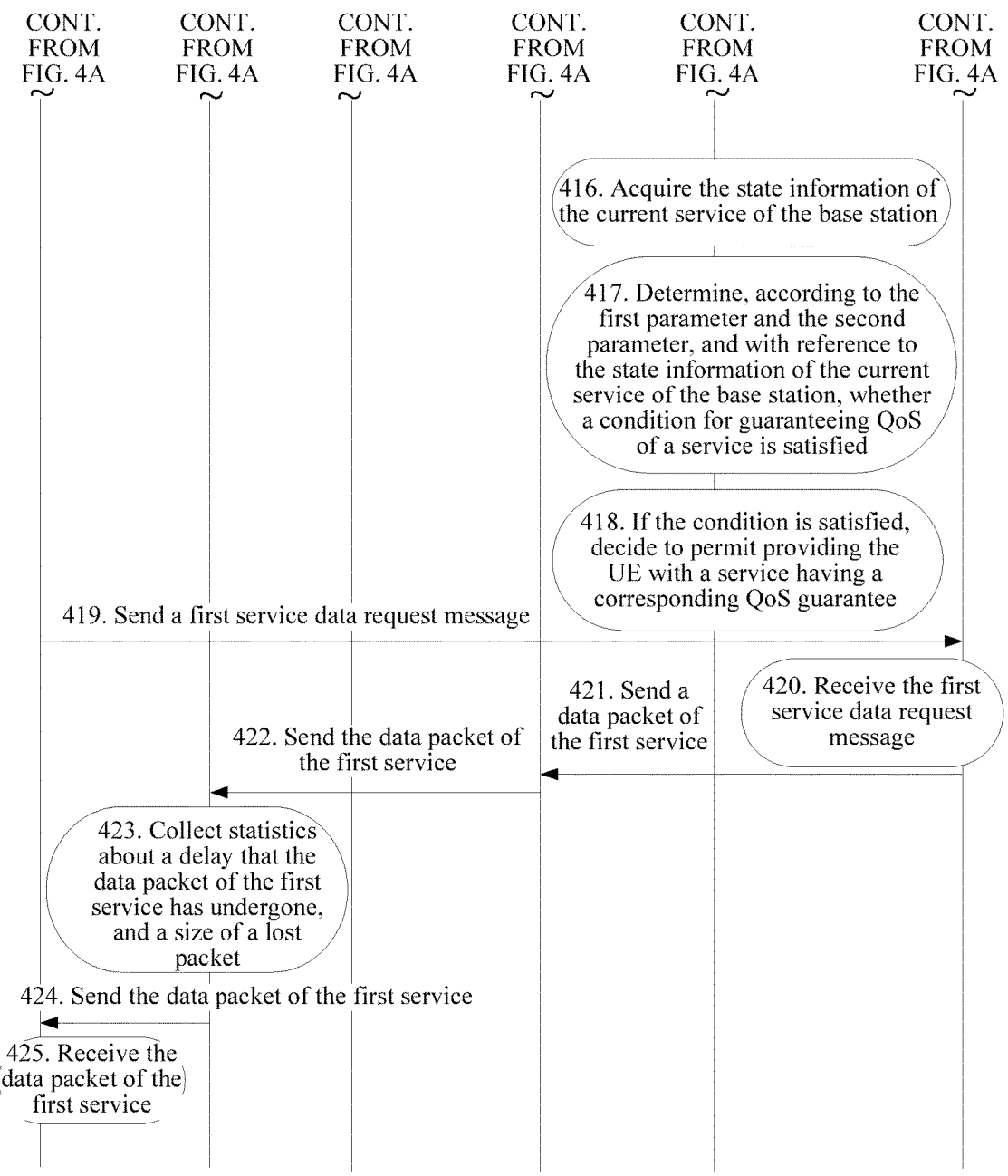

This embodiment of the present disclosure provides a wireless communications method. In this method, a first service is a unidirectional downloading service. The method is described with reference to a wireless communications system 300 shown in FIG. 3. The wireless communications system includes a UE 301, a base station 302, an SGW 303, a PCRF entity 304, a PGW 305, a server 306, a wired transmission detection apparatus 307, and an IMS 308, where the wired transmission detection apparatus 307 is deployed inside the base station 302. As shown in FIG. 4A and FIG. 4B, the method includes the following steps.

401: A UE sends a request message for a first service to an IMS.

More specifically, the request message for the first service is service control signaling, and is sent to an IMS. An application function (AF) unit in the IMS that is responsible for parsing out specific meaning of a service parses the request message for the first service.

402: The IMS parses the request message for the first service.

More specifically, after receiving the request message for the first service, the IMS parses the request message for the first service, to learn meaning represented by related signaling of the first service.

403: The IMS sends the parsed request message for the first service to a server.

More specifically, the IMS sends the parsed request message for the first service to the server, such that the server knows how to provide a service for a user.

404: The server determines a first parameter according to the request message for the first service, where the first parameter is a performance parameter of QoS of the first service.

More specifically, in this embodiment of the present disclosure, the first parameter may include an end-to-end delay $T_{E2E}$, an end-to-end packet loss rate $PL_{E2E}$, and characteristics of a future network transmission rate, including a maximum transmission rate MBR, an average transmission rate $R_{avg}$, and a mean square error $D_r$ of transmission rate variations.

405: The server sends the first parameter to a PCRF entity.

406: The PCRF entity acquires the first parameter.

407: The PCRF entity sends a first request message to a base station, where the first request message requests to acquire a third parameter, the first request message carries an identifier of the server, and the third parameter is a transmission characteristic parameter of the base station to the server.

More specifically, the third parameter is an overall transmission characteristic parameter of wired transmission from the server to the base station, and may include an average transmission delay $T_{out}$, a transmission delay mean square error $RT_{out}$, and an average transmission packet loss rate $PL_{out}$ of the wired transmission from the server to the base station.

It should be noted that, a second parameter is a transmission characteristic parameter that characterizes wired transmission of the first service, and in this embodiment of the present disclosure, a wired transmission part of the first service is a part from the server to the base station, and the third parameter is the overall transmission characteristic parameter of the wired transmission from the server to the base station; therefore, the third parameter in this embodiment of the present disclosure is the second parameter.

408: The base station receives the first request message.

It should be noted that, in this embodiment of the present disclosure, a wired transmission detection apparatus is deployed in the base station, and therefore, from the perspective of a physical interface, the base station receives the first request message; however, from the perspective of a logic interface, the first request message is finally received by the wired transmission detection apparatus.

409: The wired transmission detection apparatus in the base station indexes a prestored serving node transmission performance record table according to the identifier of the server, to determine whether the third parameter exists, where the serving node transmission performance record table records a transmission characteristic parameter of the wired transmission detection apparatus to each serving node, and the serving node is a network node that has been detected by the wired transmission detection apparatus.

410: If it is determined that the third parameter does not exist, the wired transmission detection apparatus in the base station performs detection of the third parameter.

It should be noted that, if it is determined that the third parameter exists, step 410 does not need to be performed, and step 411 is performed directly. The wireless communications method shown in FIG. 4A and FIG. 4B is described in a case in which it is determined that the third parameter does not exist. For a case in which it is determined that the third parameter exists, details are not described again.

411: The base station sends the third parameter to the PCRF entity, where the third parameter is the same as the second parameter, and the second parameter is a transmission characteristic parameter that characterizes wired transmission of the first service.

412: The PCRF entity acquires the second parameter.

413: The PCRF entity sends a second request message to the base station, where the second request message requests to acquire state information of a current service of the base station.

The state information of the current service of the base station may be shown in Table 1, and details are not described herein again in this embodiment of the present disclosure.

It should be noted that, the sending a first request message in step 407 and the sending a second request message in step 413 do not have a definite sequence. The first request message may be sent first, or the second request message may be sent first, which is not specifically limited in this embodiment of the present disclosure.

414: The base station receives the second request message.

415: The base station sends the state information of the current service of the base station to the PCRF entity.

416: The PCRF entity acquires the state information of the current service of the base station.

417: The PCRF entity determines, according to the first parameter, the second parameter, and the state information of the current service of the base station, whether a condition for guaranteeing QoS of a service is satisfied, where the service includes the first service and the current service of the base station.

More specifically, with reference to the description of step 104 in FIG. 1, when whether the condition for guaranteeing the QoS of the service is satisfied is determined according to the first parameter, the second parameter, and the state information of the current service of the base station, a maximum air interface transmission delay and a maximum packet loss rate need to be acquired first according to the first parameter and the second parameter, including calculating a first wired transmission delay and a first wired transmission packet loss rate according to the second parameter, where the first wired transmission delay is a delay of wired transmission from the server to the base station, and the first wired transmission packet loss rate is a packet loss rate of the wired transmission from the server to the base station; subtracting the first wired transmission delay from the end-to-end delay in the first parameter, to acquire the maximum air interface transmission delay; and subtracting the first wired transmission packet loss rate from the end-to-end packet loss rate in the first parameter, to acquire the maximum packet loss rate.

Exemplarily, with reference to the description of step 104, a method for determining, according to the first parameter, the second parameter, and the state information of the current service of the base station, whether a condition for guaranteeing QoS of a service is satisfied may be as follows.

The PCRF entity needs to calculate $$T_{max} = T_{E2E} - (T_{out} + k \times RT_{out})$$

to obtain a transmission delay upper limit that needs to be guaranteed during air interface transmission, that is, the maximum air interface transmission delay, where k is a linear coefficient, and a constant may be selected as the linear coefficient according to experience, for example, k=3, or the coefficient may also be updated in real time, to obtain an optimal effect.

By means of calculation of $$PL_{max}=PL_{E2E}-PL_{out},$$

a packet loss rate upper limit that needs to be guaranteed during air interface transmission, that is, the maximum packet loss rate, can be obtained.

If the base station checks bits by means of sufficiently precise cyclic redundancy check (CRC), and ensures, using a hybrid automatic request repeat technology, that a CRC check at a receive end passes, a packet loss rate of the first service may be enabled to be not greater than the maximum packet loss rate.

Generally, in an LTE system, the base station determines that a 24-bit CRC check may be used as a CRC check in physical layer channel coding, to ensure that a bit error probability in transmission data that passes the CRC check is less than $6\times10^{-8}$, and then ensure a sufficiently low packet error rate and a sufficiently low packet loss rate.

According to the maximum air interface transmission delay and the maximum packet loss rate, the PCRF entity may query a relationship between transmission delays and average spectral efficiency shown in Table 1. When the maximum air interface transmission delay is 100 milliseconds (ms), and an average channel condition is 0 decibels (dB), it may be found in Table 1 that corresponding average scheduling spectral efficiency is 0.93 bits per second per hertz (b/s/Hz). In a case in which an average rate of a service of downloading real-time streaming media is 400 kilobits per second (kbps), a maximum transmission rate of the service is 1.2 megabits per second (Mbps), and a mean square error of transmission rate variations of the service is 150 kbps, a first bandwidth may be calculated as follows: $B_{max}$=1.2 Mbps/0.93 b/s/Hz=1.29 megahertz (MHz), or a first bandwidth required by a 97.7% confidence interval may be calculated as follows: $B_{0.977}$=(400+150×2)/0.93=967 kilohertz (KHz).

The first bandwidth is added to a maximum bandwidth required by the current service of the base station, to acquire a second bandwidth. If the second bandwidth does not exceed a bandwidth of a frequency band of the base station, it is determined that a condition for guaranteeing an air interface transmission delay of the first service is satisfied.

It should be noted that, the foregoing merely exemplarily provides a method for determining, according to the first parameter, the second parameter, and the state information of the current service of the base station, whether a condition for guaranteeing QoS of a service is satisfied. There may be another method for determining, by the PCRF entity according to the first parameter and the second parameter, and with reference to the state information of the current service of the base station, whether a condition for guaranteeing QoS of a service is satisfied, which is not specifically limited in this embodiment of the present disclosure.

418: If it is determined that the condition for guaranteeing the QoS of the service is satisfied, the PCRF entity permits providing the UE with a service having a corresponding QoS guarantee.

More specifically, as an entity for deciding a service policy, the PCRF entity decides, after determining that the condition for guaranteeing the QoS of the service is satisfied, to permit providing the UE with the service having a corresponding QoS guarantee.

It should be noted that, after the PCRF entity decides to permit providing the UE with the service having a corresponding QoS guarantee, the PCRF entity may configure performance parameters that are on network nodes, for example, configure, on the PGW and an SGW, parameters required by the QoS of the first service; or the PCRF entity may send the end-to-end delay and the end-to-end packet loss rate to the base station, to configure the base station. This embodiment of the present disclosure does not specifically limit a process of configuring the performance parameters that are on the network nodes.

It should be noted that, because it is determined that the condition for guaranteeing the QoS of the service is satisfied, a connection to the first service can be established. After the performance parameters that are on the network nodes are configured according to the first parameter, step 419 is performed.

If it is determined that the condition for guaranteeing the QoS of the service is not satisfied, the PCRF entity executes a first operation. This embodiment of the present disclosure discusses only a case in which the PCRF entity determines that the condition for guaranteeing the QoS of the service is satisfied. For a process in which the PCRF entity determines that the condition for guaranteeing the QoS of the service is not satisfied and executes the first operation, refer to the description of the embodiment shown in FIG. 1, and details are not described herein again in this embodiment of the present disclosure.

419: The UE sends a first service data request message to the server, where the first service data request message requests the server to send data of the first service.

420: The server receives the first service data request message.

421: The server sends a data packet of the first service to the PGW.

More specifically, the server sends the data packet of the first service to the PGW only after the PCRF entity determines that the condition for guaranteeing the quality of service of the service is satisfied, and decides to permit providing the UE with the first service having a corresponding QoS guarantee.

422: The PGW sends the data packet of the first service to the base station according to a configuration of the PCRF entity.

423: The base station collects statistics about a delay that the data packet of the first service has undergone, and a size of a lost packet.

424: The base station sends the data packet of the first service, such that the data packet of the first service arrives at the UE before a required delay expires.

425: The UE receives the data packet of the first service.

Steps 419 to 425 are a transmission process of a service data packet performed after the PCRF entity determines that the condition for guaranteeing the quality of service of the service is satisfied, and decides to permit providing the UE with the first service having a corresponding QoS guarantee. In this process, when each data packet (such as an IP packet) is sent from the server, a timestamp is added to the data packet. For example, Real-Time Transport Protocol (RTP) encapsulation may be performed on data according to the RTP protocol, and an RTP header has a timestamp field. When the data packet arrives at the base station, the base station may calculate, according to the timestamp, how long the data packet has been delayed in a previous transmission process (for example, transmission from the server to the PGW, and then to the base station). If it is required that the end-to-end delay should not be greater than 150 ms, while the data packet has been delayed by 70 ms, the base station knows that it must be guaranteed that the data packet arrives at the UE in next 80 ms; otherwise, an end-to-end delay requirement cannot be satisfied. Processing for the packet loss rate is similar. According to previously collected statistics about a packet loss status of the data, the base station may properly determine whether a current data packet may be discarded, which is not described again in this embodiment of the present disclosure.

Figure 5:
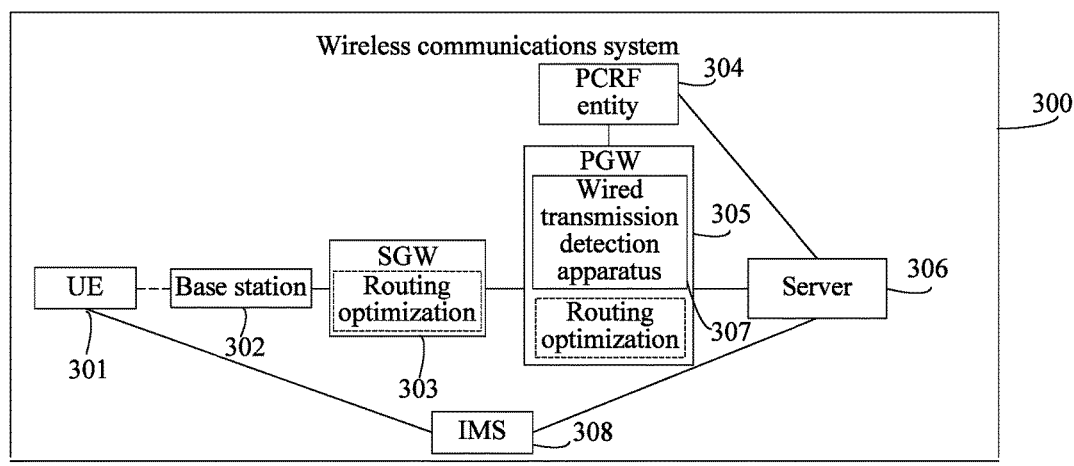
FIG. 5 is a wireless communications system according to an embodiment of the present disclosure.
Figure 6A:
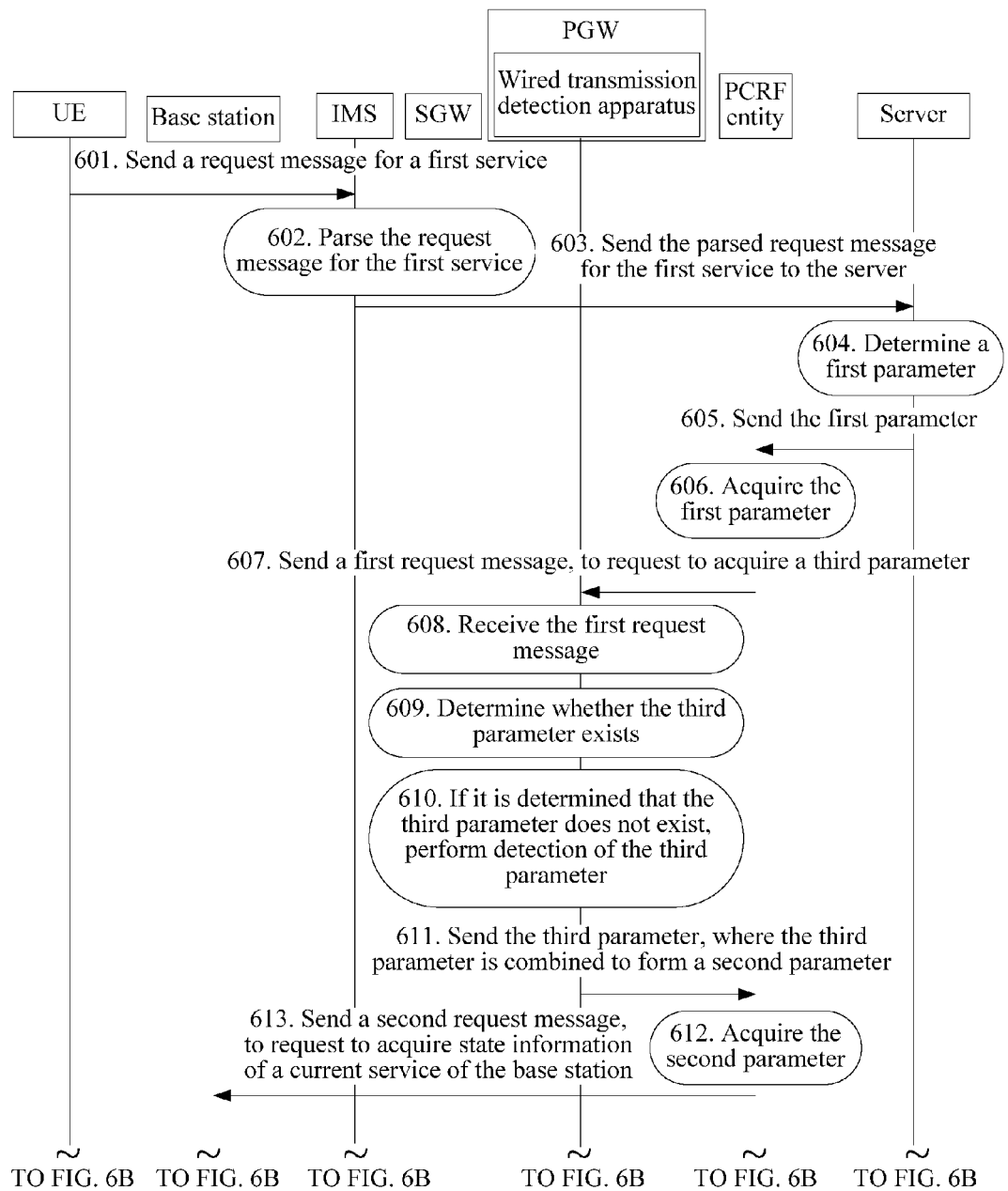
FIG. 6A and FIG. 6B are another wireless communications method according to an embodiment of the present disclosure.
Figure 6B:
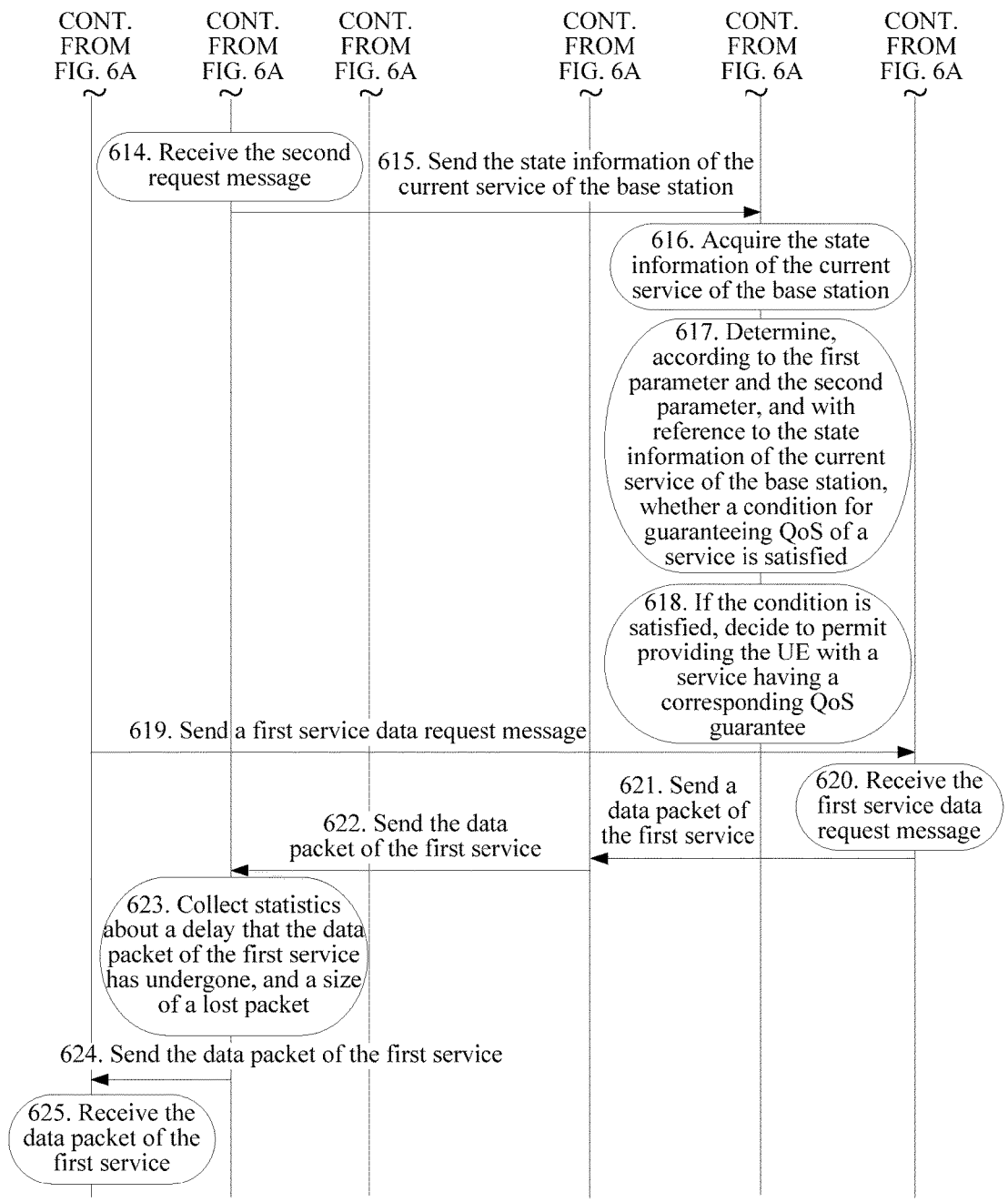

This embodiment of the present disclosure provides a wireless communications method. In this method, a first service is a unidirectional downloading service. The method is described with reference to a wireless communications system 500 shown in FIG. 5. The wireless communications system includes a UE 301, a base station 302, an SGW 303, a PCRF entity 304, a PGW 305, a server 306, a wired transmission detection apparatus 307, and an IMS 308, where the wired transmission detection apparatus 307 is deployed inside the PGW 305. As shown in FIG. 6A and FIG. 6B, the method includes the following steps.

601: A UE sends a request message for a first service to an IMS.

More specifically, the request message for the first service is service control signaling, and is sent to the IMS. An AF unit that in the IMS that is responsible for parsing out specific meaning of a service parses the request message for the first service.

602: The IMS parses the request message for the first service.

More specifically, after receiving the request message for the first service, the IMS parses the request message for the first service, to learn meaning represented by related signaling of the first service.

603: The IMS sends the parsed request message for the first service to a server.

More specifically, the IMS sends the parsed request message for the first service to the server, such that the server knows how to provide a service for a user.

604: The server determines a first parameter according to the request message for the first service, where the first parameter is a performance parameter of QoS of the first service.

In this embodiment of the present disclosure, the first parameter may include an end-to-end delay $T_{E2E}$, an end-to-end packet loss rate $PL_{E2E}$, and characteristics of a future network transmission rate, including a maximum transmission rate MBR, an average transmission rate $R_{avg}$, and a mean square error $D_r$ of transmission rate variations.

605: The server sends the first parameter to a PCRF entity.

606: The PCRF entity acquires the first parameter.

607: The PCRF entity sends a first request message to a PGW, where the first request message requests to acquire a third parameter, the first request message carries an identifier of the server and an identifier of a base station, and the third parameter is a transmission characteristic parameter of the PGW to the server and a transmission characteristic parameter of the PGW to the base station.

More specifically, a second parameter is a transmission characteristic parameter that characterizes wired transmission of the first service, and in this embodiment of the present disclosure, a wired transmission part of the first service is a part from the server to the base station, and the third parameter is the transmission characteristic parameter of the PGW to the server and the transmission characteristic parameter of the PGW to the base station; therefore, the second parameter can be obtained using the third parameter in this embodiment of the present disclosure.

It should be noted that, the sending a first request message to a PGW is on the basis that a wired transmission detection apparatus deployed in the PGW may further acquire the transmission characteristic parameter of the PGW to the base station. If a characteristic of wired transmission from the PGW to the base station is obtained by means of measurement by another network node, the first request message may include several sub-messages. That is, the PCRF entity not only sends a request message to the PGW, but also sends a request message to another network node, to request to acquire the transmission characteristic parameter of the PGW to the base station. This embodiment of the present disclosure does not specifically limit signaling during acquisition of the second parameter.

608: The PGW receives the first request message.

It should be noted that, in this embodiment of the present disclosure, the wired transmission detection apparatus is deployed in the PGW, and therefore, from the perspective of a physical interface, the PGW receives the first request message; however, from the perspective of a logic interface, the first request message is finally received by the wired transmission detection apparatus.

609: The wired transmission detection apparatus in the PGW indexes a prestored serving node transmission performance record table according to the identifier of the server, to determine whether the third parameter exists, where the serving node transmission performance record table records a transmission characteristic parameter of the wired transmission detection apparatus to each serving node, and the serving node is a network node that has been detected by the wired transmission detection apparatus.

610: If it is determined that the third parameter does not exist, the wired transmission detection apparatus in the PGW performs detection of the third parameter.

It should be noted that, if it is determined that the third parameter exists, step 610 does not need to be performed, and step 611 is performed directly. The wireless communications method shown in FIG. 6A and FIG. 6B is described in a case in which it is determined that the third parameter does not exist. For a case in which it is determined that the third parameter exists, details are not described again.

More specifically, because the third parameter in this embodiment of the present disclosure includes two parts, namely, the transmission characteristic parameter of the PGW to the server and the transmission characteristic parameter of the PGW to the base station, in a process that a serving node indexing unit included in the wired transmission detection apparatus indexes the prestored serving node transmission performance record table, to determine whether the third parameter exists, the serving node indexing unit needs to separately determine, according to the identifier of the server and the identifier of the base station that are carried in the first request message, whether the transmission characteristic parameter of the PGW to the server and the transmission characteristic parameter of the PGW to the base station exist. If the transmission characteristic parameter of the PGW to the base station exists, and the transmission characteristic parameter of the PGW to the server does not exist, detection of only the transmission characteristic parameter of the PGW to the server may be performed; or if the transmission characteristic parameter of the PGW to the base station does not exist, and the transmission characteristic parameter of the PGW to the server exists, detection of only the transmission characteristic parameter of the PGW to the base station may be performed.

The third parameter may be an average transmission delay $T_{out}$, a transmission delay mean square error $RT_{out}$, and an average transmission packet loss rate $PL_{out}$ of wired transmission from the server to the PGW and an average transmission delay $T_{GW}$, a transmission delay mean square error $RT_{GW}$, and an average transmission packet loss rate $PL_{GW}$ of wired transmission from the PGW to the base station.

The PGW or SGW may include a wired routing optimization apparatus, where the wired routing optimization apparatus includes a routing query device, which provides a possible route for a base station in which a UE is located and transmission performance of a currently measured or recorded route; a routing table, which may be various storage media, including a hard disk, a solid-state disk, a random access memory (RAM), a magnetic tape, and the like, and records various possible routes for routing from the PGW/SGW to the base station in which the UE is located, and transmission performance obtained by means of measurement after the routes are selected, where the transmission performance includes but is not limited to an average transmission delay, a transmission delay square error, a packet loss rate, and the like; and a routing balancing device, which selects, according to routing performance required by the PCRF entity, a route from the PGW/SGW to the base station in which the UE is located.

The wired routing optimization apparatus may determine a routing manner according to a requirement on quality of service and an external network transmission characteristic, and then detect a characteristic parameter on a determined routing path to acquire a fourth parameter, which is not described in detail in this embodiment of the present disclosure.

Exemplarily, for a service of high quality of service, for example, a voice call, or in a scenario in which a characteristic of transmission from the PGW to the server is relatively poor, a routing path having a relatively short transmission delay may be selected. For a service whose requirement on quality of service is not high, for example, webpage browsing, another route having a relatively long transmission delay may be selected, to avoid congestion in data transmission of a real-time voice call service.

611: The PGW sends the third parameter to the PCRF entity, where the third parameter is combined to form the second parameter, and the second parameter is a transmission characteristic parameter that characterizes wired transmission of the first service.

612: The PCRF entity acquires the second parameter.

613: The PCRF entity sends a second request message to the base station, where the second request message requests to acquire state information of a current service of the base station.

The state information of the current service of the base station may be shown in Table 1, and details are not described herein again in this embodiment of the present disclosure.

It should be noted that, the sending a first request message in step 607 and the sending a second request message in step 613 do not have a definite sequence. The first request message may be sent first, or the second request message may be sent first, which is not specifically limited in this embodiment of the present disclosure.

614: The base station receives the second request message.

615: The base station sends the state information of the current service of the base station to the PCRF entity.

616: The PCRF entity acquires the state information of the current service of the base station.

617: The PCRF entity determines, according to the first parameter, the second parameter, and the state information of the current service of the base station, whether a condition for guaranteeing QoS of a service is satisfied, where the service includes the first service and the current service of the base station.

More specifically, with reference to the description of step 104 in FIG. 1 and step 417 in FIG. 4B, a method exemplarily provided herein for determining, according to the first parameter, the second parameter, and the state information of the current service of the base station, whether a condition for guaranteeing QoS of a service is satisfied may be as follows.

The PCRF entity needs to calculate $$T_{max}=T_{E2E}-(T_{out}+k\times RT_{out})-(T_{GW}+k\times RT_{GW})$$

to obtain a transmission delay upper limit that needs to be guaranteed during air interface transmission, that is, the maximum air interface transmission delay, where k is a linear coefficient, and a constant may be selected as the linear coefficient according to experience, for example, k=3, or the coefficient may also be updated in real time, to obtain an optimal effect.

By means of calculation of $$PL_{max}=PL_{E2E}-PL_{out}-PL_{GW},$$

a packet loss rate upper limit that needs to be guaranteed during air interface transmission, that is, the maximum packet loss rate, can be obtained.

If the base station checks bits using sufficiently precise CRC, and ensures, using a hybrid automatic request repeat technology, that a CRC check at a receive end is passed, a packet loss rate of the first service may be enabled to be not greater than the maximum packet loss rate.

Generally, in an LTE system, the base station determines that a 24-bit CRC check may be used as a CRC check in physical layer channel coding, to ensure that a bit error probability in transmission data that passes the CRC check is less than $6\times 10^{-8}$, and then ensure a sufficiently low packet error rate and a sufficiently low packet loss rate.

According to the maximum air interface transmission delay and the maximum packet loss rate, the PCRF entity may query a relationship between transmission delays and average spectral efficiency shown in Table 1. When the maximum air interface transmission delay is 100 ms, and an average channel condition is 0 dB, it may be found in Table 1 that corresponding average scheduling spectral efficiency is 0.93 b/s/Hz. In a case in which an average rate of a service of downloading real-time streaming media is 600 kbps, a maximum transmission rate of the service is 1.2 Mbps, and a mean square error of transmission rate variations of the service is 150 kbps, a first bandwidth may be calculated as follows: $B_{max}$=1.2 Mbps/0.93 b/s/Hz=1.29 MHz, or a first bandwidth required by a 99% confidence interval may be calculated as follows: B0.977=(600+150×2.576)/0.93=1060 KHz.

The first bandwidth is added to a maximum bandwidth required by the current service of the base station, to acquire a second bandwidth. If the second bandwidth does not exceed a bandwidth of a frequency band of the base station, it is determined that a condition for guaranteeing an air interface transmission delay of the first service is satisfied.

It should be noted that, the foregoing merely exemplarily provides a method for determining, according to the first parameter, the second parameter, and the state information of the current service of the base station, whether a condition for guaranteeing QoS of a service is satisfied. There may be another method for determining, by the PCRF entity according to the first parameter and the second parameter, and with reference to the state information of the current service of the base station, whether a condition for guaranteeing QoS of a service is satisfied, which is not specifically limited in this embodiment of the present disclosure.

618: If it is determined that the condition for guaranteeing the QoS of the service is satisfied, the PCRF entity decides to permit providing the UE with a service having a corresponding QoS guarantee.

More specifically, as an entity for deciding a service policy, the PCRF entity decides, after determining that the condition for guaranteeing the QoS of the service is satisfied, to permit providing the UE with the service having a corresponding QoS guarantee.

It should be noted that, after the PCRF entity decides to permit providing the UE with the service having a corresponding QoS guarantee, the PCRF entity may configure performance parameters that are on network nodes, for example, configure, on the PGW and an SGW, parameters required by the QoS of the first service; or the PCRF entity may send the end-to-end delay and the end-to-end packet loss rate to the base station, to configure the base station. This embodiment of the present disclosure does not specifically limit a process of configuring the performance parameters that are on the network nodes.

It should be noted that, because it is determined that the condition for guaranteeing the QoS of the service is satisfied, a connection to the first service can be established. After the performance parameters that are on the network nodes are configured according to the first parameter, step 619 is performed.

If it is determined that the condition for guaranteeing the QoS of the service is not satisfied, the PCRF entity executes a first operation. This embodiment of the present disclosure discusses only a case in which the PCRF entity determines that the condition for guaranteeing the QoS of the service is satisfied. For a process in which the PCRF entity determines that the condition for guaranteeing the QoS of the service is not satisfied and executes the first operation, refer to the description of the embodiment shown in FIG. 1, and details are not described herein again in this embodiment of the present disclosure.

619: The UE sends a first service data request message to the server, where the first service data request message requests the server to send data of the first service.

620: The server receives the first service data request message.

621: The server sends a data packet of the first service to the PGW.

622: The PGW sends the data packet of the first service to the base station according to a configuration of the PCRF entity.

623: The base station collects statistics about a delay that the data packet of the first service has undergone, and a size of a lost packet.

624: The base station sends the data packet of the first service, such that the data packet of the first service arrives at the UE before a required delay expires.

625: The UE receives the data packet of the first service.

Steps 619 to 625 are a transmission process of a service data packet performed after the PCRF entity determines that the condition for guaranteeing the quality of service of the service is satisfied, and decides to permit providing the UE with the first service having a corresponding QoS guarantee. In this process, when each data packet (such as an IP packet) is sent from the server, a timestamp is added to the data packet. For example, RTP encapsulation may be performed on data according to the RTP protocol, and an RTP header has a timestamp field. When the data packet arrives at the base station, the base station may calculate, according to the timestamp, how long the data packet has been delayed in a previous transmission process (for example, transmission from the server to the PGW, and then to the base station). If it is required that the end-to-end delay should not be greater than 150 ms, while the data packet has been delayed by 70 ms, the base station knows that it must be guaranteed that the data packet arrives at the UE in next 80 ms; otherwise, an end-to-end delay requirement cannot be satisfied. Processing for the packet loss rate is similar. According to previously collected statistics about a packet loss status of the data, the base station may properly determine whether a current data packet may be discarded, which is not described again in this embodiment of the present disclosure.

This embodiment of the present disclosure provides a wireless communications method. A first service in the method is a bidirectional call service. The method is described with reference to a wireless communications system 700 in FIG. 7. The wireless communications system includes a UE 1 701, a base station 1 702, an SGW 1 703, a PCRF entity 1 704, a PGW 1 705, a UE 2 706, a base station 2 707, an SGW 2 708, a PCRF entity 2 709, a PGW 2 710, a server 711, a wired transmission detection apparatus 1 712, and a wired transmission detection apparatus 2 713, where the wired transmission detection apparatus 1 712 is deployed in the base station 1 702, and the wired transmission detection apparatus 2 713 is deployed in the base station 2 707. A unidirectional call from the UE 2 to the UE 1 is used as an example for description. As shown in FIG. 8A, FIG. 8B, FIG. 8C and FIG. 8D, the method includes the following steps.

801: A UE 1 sends a request message for a first service to a server.

It should be noted that, the request message for the first service may carry capability information of the UE 1 and capability information of a UE 2, and quality of a bidirectional call that can be finally allowed by the server is also related to capabilities of the UE 1 and the UE 2. For example, if a central processing unit (CPU) of the UE 1 has a relatively poor processing capability and cannot decode high-definition voice code, the UE 1 cannot enjoy a high-definition call even if a network can ensure transmission quality. This embodiment of the present disclosure is on the basis that the capabilities of the UE 1 and the UE 2 do not affect the quality of the bidirectional call, and does not specifically elaborate or limit related content of the capabilities of the UE 1 and the UE 2.

802: The server determines a first parameter according to the request message for the first service, where the first parameter is a performance parameter of QoS of the first service.

In this embodiment of the present disclosure, the first parameter may include an end-to-end delay $T_{E2E}$, an end-to-end packet loss rate $PL_{E2E}$, and characteristics of a future network transmission rate, including a maximum voice transmission rate MBR and a voice activity factor r.

803a: The server sends the first parameter to a PCRF entity 1.

804a: The PCRF entity 1 acquires the first parameter.

805a: The PCRF entity 1 sends a first request message to a base station 1, where the first request message requests to acquire a third parameter, the first request message carries an identifier of a base station 2, and the third parameter is a transmission characteristic parameter of the base station 1 to the base station 2.

More specifically, the third parameter is an overall transmission characteristic parameter of wired transmission from the base station 1 to the base station 2, and may include an average transmission delay $T_{out}$, a transmission delay mean square error $RT_{out}$, and an average transmission packet loss rate $PL_{out}$ of the wired transmission from the base station 1 to the base station 2.

It should be noted that, a second parameter is a transmission characteristic parameter that characterizes wired transmission of the first service, and in this embodiment of the present disclosure, a wired transmission part of the first service is a part from the base station 1 to the base station 2, and the third parameter is the overall transmission characteristic parameter of the wired transmission from the base station 1 to the base station 2. Therefore, the third parameter in this embodiment of the present disclosure is the second parameter.

806a: The base station 1 receives the first request message.

It should be noted that, in this embodiment of the present disclosure, a wired transmission detection apparatus is deployed in the base station, and therefore, from the perspective of a physical interface, the base station 1 receives the first request message; however, from the perspective of a logic interface, the first request message is finally received by a wired transmission detection apparatus 1.

807a: The wired transmission detection apparatus 1 in the base station 1 indexes a prestored serving node transmission performance record table according to an identifier of the server, to determine whether the third parameter exists, where the serving node transmission performance record table records a transmission characteristic parameter of the wired transmission detection apparatus to each serving node, and the serving node is a network node that has been detected by the wired transmission detection apparatus.

808a: If it is determined that the third parameter does not exist, the wired transmission detection apparatus 1 in the base station 1 performs detection of the third parameter.

Figure 10:
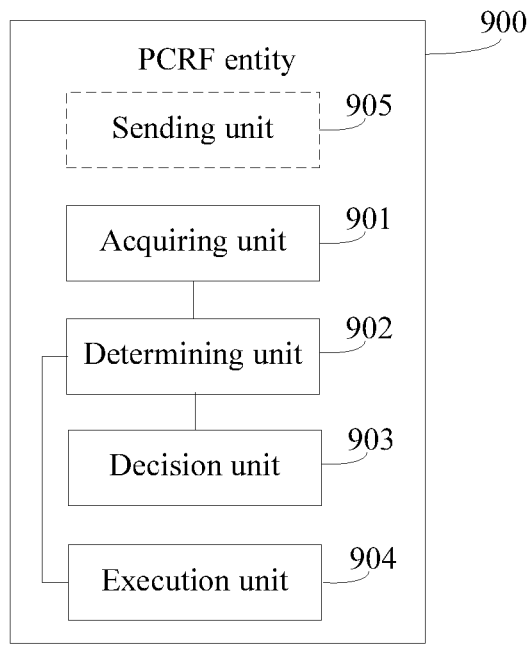
FIG. 10 is a schematic structural diagram of another PCRF entity according to an embodiment of the present disclosure.

It should be noted that, if it is determined that the third parameter exists, step 808a does not need to be performed, and step 809a is performed directly. The wireless communications method shown in FIG. 10 is described in a case in which it is determined that the third parameter does not exist. For a case in which it is determined that the third parameter exists, details are not described again.

809a: The base station 1 sends the third parameter to the PCRF entity 1, where the third parameter is the same as the second parameter, and the second parameter is a transmission characteristic parameter that characterizes wired transmission of the first service.

810a: The PCRF entity 1 acquires the second parameter.

811a: The PCRF entity 1 sends a second request message to the base station 1, where the second request message requests to acquire state information of a current service of the base station 1.

The state information of the current service of the base station 1 may be shown in Table 1, and details are not described herein again in this embodiment of the present disclosure.

812a: The base station 1 receives the second request message.

813a: The base station 1 sends the state information of the current service of the base station 1 to the PCRF entity 1.

814a: The PCRF entity 1 acquires the state information of the current service of the base station 1.

815a: The PCRF entity 1 sends a third request message to the base station 2, where the third request message requests to acquire a call delay and a call packet loss rate that are guaranteed by the base station 2.

It may be assumed herein that the call delay guaranteed by the base station is $T_{UL}$, and the call packet loss rate guaranteed by the base station is $PL_{UL}$.

816a: The base station 2 receives the third request message.

817a: The base station 2 sends, to the PCRF entity 1, the call delay and the call packet loss rate that are guaranteed by the base station 2.

It should be noted that, the sending a first request message in step 805a, the sending a second request message in step 811a, and the sending a third request message in step 815a do not have a definite sequence. The first request message may be sent first, or the second request message may be sent first, or the third request message may be sent first, which is not specifically limited in this embodiment of the present disclosure.

818a: The PCRF entity 1 acquires the call delay and the call packet loss rate that are guaranteed by the base station 2.

819a: The PCRF entity 1 determines, according to the first parameter, the second parameter, and the state information of the current service of the base station 1, whether a condition for guaranteeing QoS of a service is satisfied, where the service includes the first service and the current service of the base station.

More specifically, with reference to the description of step 104 in FIG. 1 and step 417 in FIG. 4B, a method exemplarily provided herein for determining, according to the first parameter, the second parameter, and the state information of the current service of the base station, whether a condition for guaranteeing QoS of a service is satisfied may be as follows.

The PCRF entity needs to calculate $$T_{max} = T_{E2E} - (T_{out} + k \times RT_{out}) - T_{UL}$$

to obtain a transmission delay upper limit that needs to be guaranteed during air interface transmission from the base station 1 to the UE 1, that is, the maximum air interface transmission delay, where k is a linear coefficient, and a constant may be selected as the linear coefficient according to experience, for example, k=3, or the coefficient may also be updated in real time, to obtain an optimal effect.

By means of calculation of $$PL_{max} = PL_{E2E} - PL_{out} - PL_{UL},$$

a packet loss rate upper limit that needs to be guaranteed during air interface transmission from the base station 1 to the UE 1, that is, the maximum packet loss rate, can be obtained.

If a current CRC check of the base station 1 can enable a packet loss rate of the first service to be not greater than the maximum packet loss rate, it is determined that a condition for guaranteeing a maximum packet loss rate of the first service is satisfied.

Generally, in an LTE system, the base station 1 determines that a 24-bit CRC check may be used as a CRC check in physical layer channel coding, to ensure that a bit error probability in transmission data that passes the CRC check is less than $6 \times 10^{-8}$, and then ensure a sufficiently low packet error rate and a sufficiently low packet loss rate. Based on this, when transmitting data packets over a downlink, the base station 1 using the LTE protocol may proactively discard some data packets according to a size of a current lost packet, thereby reducing a transmission delay of the data packets as much as possible on the premise of ensuring a restrictive condition satisfied by a packet loss rate.

According to the maximum air interface transmission delay and the maximum packet loss rate, the PCRF entity 1 may query a relationship between transmission delays and average spectral efficiency shown in Table 1. When the maximum air interface transmission delay is 80 ms, and an average channel condition is 0 dB, it may be found in Table 1 that corresponding average scheduling spectral efficiency is 0.93 b/s/Hz. If a maximum audio coding rate is 14.4 kbps, because the voice activity factor is not 1, on the premise that a first bandwidth satisfies $B_{max}$=14.4/0.93=15.5 KHz, a requirement on quality of service of a voice call can be guaranteed. The system may also collect statistics about a corresponding transmission rate characteristic according to characteristics of the audio coding rate and the activity factor, for example, collect statistics about an actual transmission rate within 99% of a time period, to determine a bandwidth requirement.

The first bandwidth is added to a maximum bandwidth required by the current service of the base station, to acquire a second bandwidth. If the second bandwidth does not exceed a bandwidth of a frequency band of the base station 1, it is determined that a condition for guaranteeing an air interface transmission delay of the first service is satisfied.

It should be noted that, the foregoing merely exemplarily provides a method for determining, according to the first parameter, the second parameter, and the state information of the current service of the base station 1, whether a condition for guaranteeing QoS of a unidirectional call line from the UE 2 to the UE 1 is satisfied. There may be another method for determining, by the PCRF entity 1 according to the first parameter and the second parameter, and with reference to the state information of the current service of the base station 1, whether a condition for guaranteeing QoS of a service is satisfied, which is not specifically limited in this embodiment of the present disclosure.

820a: If it is determined that the condition for guaranteeing the QoS of the service is satisfied, the PCRF entity 1 permits providing the UE 1 with a service having a corresponding QoS guarantee.

More specifically, if it is determined that the condition for guaranteeing the QoS of the service is satisfied, it indicates that QoS of a downlink voice service of the UE 1 can be guaranteed. In this case, as an entity for deciding a service policy, the PCRF entity 1 decides to permit providing the UE 1 with the service having a corresponding QoS guarantee.

It should be noted that, after the PCRF entity 1 decides to permit providing the UE 1 with the service having a corresponding QoS guarantee, the PCRF entity 1 may configure performance parameters that are on network nodes, for example, configure, on a PGW 1 and an SGW 1, parameters required by the QoS of the first service; or the PCRF entity 1 may send the end-to-end delay and the end-to-end packet loss rate to the base station 1, to configure the base station 1. This embodiment of the present disclosure does not specifically limit a process of configuring the performance parameters that are on the network nodes.

If it is determined that the condition for guaranteeing the QoS of the service is not satisfied, the PCRF entity 1 executes a first operation. This embodiment of the present disclosure discusses only a case in which the PCRF entity 1 determines that the condition for guaranteeing the QoS of the service is satisfied. For a process in which the PCRF entity determines that the condition for guaranteeing the QoS of the service is not satisfied and executes the first operation, refer to the description of the embodiment shown in FIG. 1, and details are not described herein again in this embodiment of the present disclosure.

803b-820b: Steps 803b to 820b are steps for determining whether QoS of a downlink voice service of the UE 2 can be guaranteed. For details, refer to steps 803a to 820a that are steps for determining whether the QoS of the downlink voice service of the UE 1 can be guaranteed, which are not described again in this embodiment of the present disclosure.

On the premise that the QoS of the downlink voice service of the UE 1 can be guaranteed and the QoS of the downlink voice service of the UE 2 can be guaranteed, step 821 may be performed.

821: The UE 1 sends a data packet of the first service to the base station 2.

822: The base station 2 collects statistics about a delay that the data packet of the first service has undergone, and a size of a lost packet.

823: The base station 2 sends the data packet of the first service, such that the data packet of the first service arrives at the UE 2 before a required delay expires.

824: The UE 2 receives the data packet of the first service.

It should be noted that, steps 821 to 824 are a process that, in a case in which parameters of network nodes have been configured by the PCRF entity 1 and the PCRF entity 2 when it is determined that the QoS of the downlink voice service of the UE 1 can be guaranteed and it is determined that the QoS of the downlink voice service of the UE 2 can be guaranteed, speech of the UE 1 is received by the UE 2 after, as it is assumed, a call is started. A process that speech of the UE 2 is received by the UE 1 is similar to this process, and details are not described again in this embodiment of the present disclosure.

In a transmission process of service data packets, when each data packet (such as an IP packet) is sent from the server, a timestamp is added to the data packet. For example, RTP encapsulation may be performed on data according to the RTP protocol, and an RTP header has a timestamp field. When the data packet arrives at a base station, the base station may calculate, according to the timestamp, how long the data packet has been delayed in a previous transmission process (for example, transmission from the server to a PGW, and then to the base station). If it is required that the end-to-end delay should not be greater than 150 ms, while the data packet has been delayed by 70 ms, the base station knows that it must be guaranteed that the data packet arrives at a UE in next 80 ms; otherwise, an end-to-end delay requirement cannot be satisfied. Processing for the packet loss rate is similar. According to previously collected statistics about a packet loss status of the data, the base station may properly determine whether a current data packet may be discarded, which is not described again in this embodiment of the present disclosure.

Further, from the perspective of a communications carrier, before determining whether the condition for guaranteeing the QoS of the service is satisfied, a PCRF entity may first determine a service level preliminarily. That is, the PCRF entity may preliminarily determine, according to information about a user that is stored by the carrier, such as a subscriber category and a payment amount, whether a service requested by the first service request can be provided for the user. The PCRF entity further determines whether a network can satisfy the condition for guaranteeing the QoS of the service only after it is preliminarily determined that the carrier can provide the service requested by the first service request for the user. Therefore, before the PCRF entity sends the first request message, the method further includes acquiring, by the PCRF entity, an identifier of a user of a current UE; querying, by the PCRF entity according to the identifier of the user, a prestored user profile corresponding to the user; determining, by the PCRF entity according to the user profile, whether the quality of service of the first service can be provided for the user; and if it is determined that the quality of service of the first service can be provided for the user, performing, by the PCRF entity, the step of sending a first request message.

Further, if the PCRF entity determines that the condition for guaranteeing the QoS of the service is satisfied, the method further includes determining, by the PCRF entity, a corresponding charging standard according to a related performance parameter of the QoS of the first service.

More specifically, the PCRF entity may determine whether to charge a fee according to the end-to-end delay and the packet loss rate, and determine a corresponding charging standard according to the transmission rate.

Further, in a wireless communications process, the wired transmission detection apparatus has a function of monitoring an external network transmission characteristic. Assuming that a transmission characteristic parameter at a first moment that is corresponding to a first serving node is recorded in the serving node transmission performance record table currently, after a transmission characteristic parameter at a second moment that is corresponding to the first serving node is detected at the second moment, if it is found by means of comparison that a deviation between transmission characteristics at the first moment and the second moment is relatively large, a condition for guaranteeing QoS of the first service may not be satisfied. Therefore, when the transmission characteristic parameter at the first moment that is corresponding to the first serving node is recorded in the serving node transmission performance record table, the method further includes performing, by the wired transmission detection apparatus, detection of the transmission characteristic parameter at the second moment that is corresponding to the first serving node; and if a deviation between the transmission characteristic parameter at the first moment and the transmission characteristic parameter at the second moment is greater than a first threshold, sending, by the wired transmission detection apparatus, a first instruction message to a PCRF entity, where the first instruction message instructs the PCRF entity to acquire a first parameter again, and the first parameter is a performance parameter of QoS of a first service requested by a current UE, and may include at least one of the following parameters: an end-to-end delay, an end-to-end packet loss rate, and a future network transmission rate.

Then, the PCRF entity restarts a process of negotiating the QoS of the first service.

This embodiment of the present disclosure provides a wireless communications method. The method includes acquiring, by a PCRF entity, a first parameter, a second parameter, and state information of a current service of a base station, where the first parameter is a performance parameter of QoS of a first service requested by a current UE, and the second parameter is a transmission characteristic parameter that characterizes wired transmission of the first service; determining, according to the first parameter, the second parameter, and the state information of the current service of the base station, whether a condition for guaranteeing QoS of a service is satisfied; and if it is determined that the condition for guaranteeing the QoS of the service is satisfied, permitting providing the UE with the first service having a corresponding QoS guarantee; or if it is determined that the condition for guaranteeing the QoS of the service is not satisfied, executing a first operation. Using the method, an end-to-end delay in a wireless communications process can be guaranteed, and quality of service in the wireless communications process can be improved.

Embodiment 3

Figure 9:
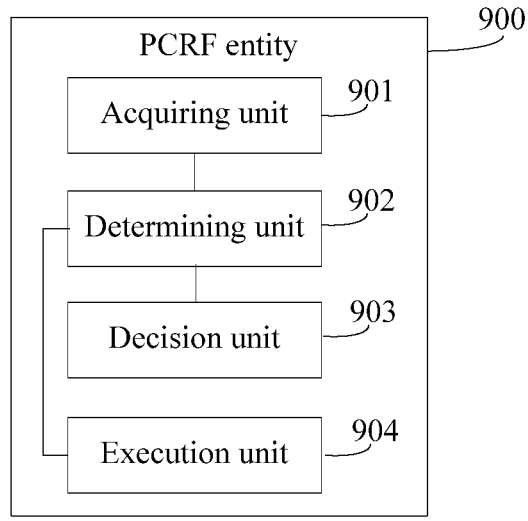
FIG. 9 is a schematic structural diagram of a PCRF entity according to an embodiment of the present disclosure.

This embodiment of the present disclosure provides a PCRF entity 900. As shown in FIG. 9, the PCRF entity 900 includes an acquiring unit 901, a determining unit 902, a decision unit 903, and an execution unit 904.

The acquiring unit 901 is configured to acquire a first parameter, and send the first parameter to the determining unit 902, where the first parameter is a performance parameter of QoS of a first service requested by a current UE; acquire a second parameter, and send the second parameter to the determining unit 902, where the second parameter is a transmission characteristic parameter that characterizes wired transmission of the first service; and acquire state information of a current service of a base station, and send the state information of the current service of the base station to the determining unit 902.

The determining unit 902 is configured to determine, according to the first parameter, the second parameter, and the state information of the current service of the base station that are acquired by the acquiring unit 901, whether a condition for guaranteeing QoS of a service is satisfied, where the service includes the first service and the current service of the base station.

The decision unit 903 is configured to decide, when the determining unit 902 determines that the condition for guaranteeing the QoS of the service is satisfied, to permit providing the UE with the first service having a corresponding QoS guarantee.

The execution unit 904 is configured to execute a first operation when the determining unit 902 determines that the condition for guaranteeing the QoS of the service is not satisfied.

Further, as shown in FIG. 10, the PCRF entity further includes a sending unit 905.

The acquiring unit 901 is configured to request, using the sending unit 905 to send a first request message to another network node, to acquire the second parameter.

Figure 11:
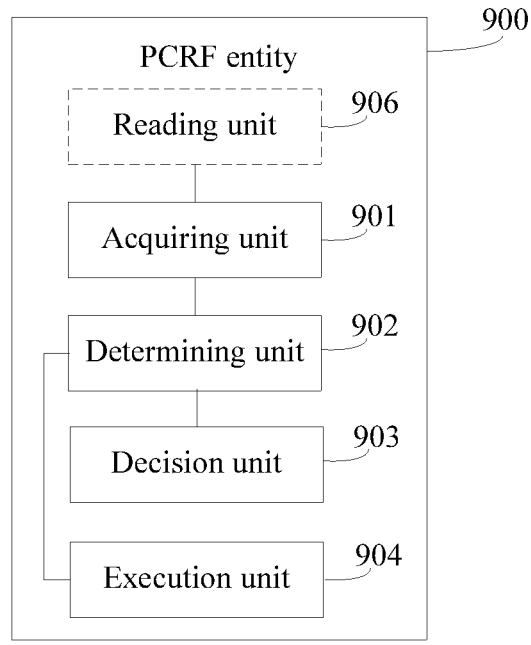
FIG. 11 is a schematic structural diagram of still another PCRF entity according to an embodiment of the present disclosure.

Alternatively, as shown in FIG. 11, the PCRF entity further includes a reading unit 906.

The acquiring unit 901 is configured to acquire the second parameter using the reading unit to read stored record data of the second parameter.

Further, the acquiring unit 901 is configured to request, using the sending unit 905 to send a second request message to the base station, to acquire the state information of the current service of the base station; or acquire the state information of the current service of the base station using the reading unit 906 to read stored record data of the state information of the current service of the base station.

Further, the execution unit 904 is configured to send a third request message to a server, to request to re-determine the first parameter; acquire a first parameter re-determined by the server; and determine, according to the re-determined first parameter and the second parameter, and with reference to the state information of the current service of the base station, whether the condition for guaranteeing the QoS of the service is satisfied, until it is determined that the condition for guaranteeing the QoS of the service is satisfied.

Alternatively, the execution unit 904 is configured to reject establishing a connection to the first service.

Further, the first parameter includes at least one of the following: an end-to-end delay, an end-to-end packet loss rate, and a future network transmission rate.

Figure 12:
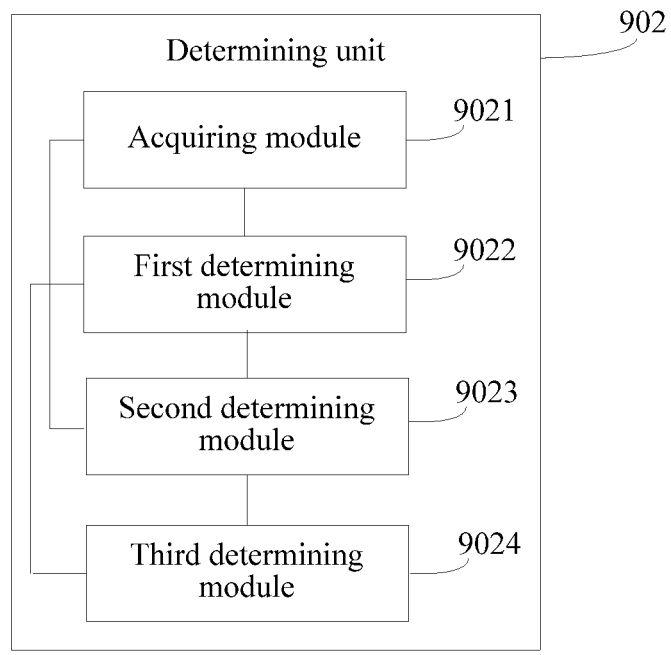
FIG. 12 is a schematic structural diagram of a determining unit inside a PCRF entity according to an embodiment of the present disclosure.

Further, as shown in FIG. 12, the determining unit 902 includes an acquiring module 9021, a first determining module 9022, a second determining module 9023, and a third determining module 9024.

The acquiring module 9021 is configured to acquire a maximum air interface transmission delay and a maximum packet loss rate according to the first parameter and the second parameter.

The first determining module 9022 is configured to determine, according to the maximum air interface transmission delay acquired by the acquiring module 9021 and the state information of the current service of the base station acquired by the acquiring unit 901, whether a condition for guaranteeing an air interface transmission delay of the first service is satisfied.

The second determining module 9023 is configured to determine, according to the maximum packet loss rate acquired by the acquiring module 9021 and the state information of the current service of the base station acquired by the acquiring unit 901, whether a condition for guaranteeing a maximum packet loss rate of the first service is satisfied.

The third determining module 9024 is configured to, when the first determining module 9022 determines that the condition for guaranteeing the air interface transmission delay of the first service is satisfied, and the second determining module 9023 determines that the condition for guaranteeing the maximum packet loss rate of the first service is satisfied, determine that the condition for guaranteeing the QoS of the service is satisfied.

Figure 13:
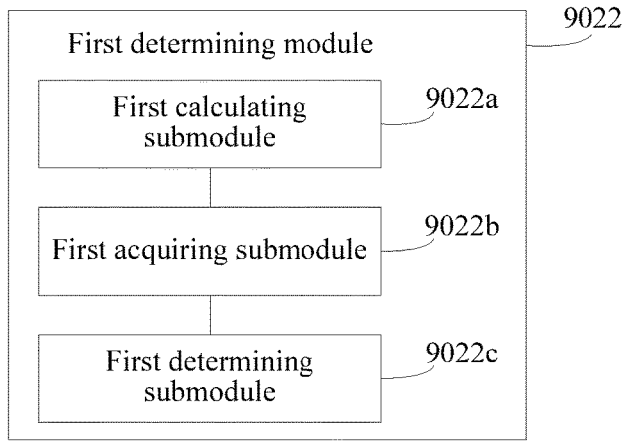
FIG. 13 is a schematic structural diagram of a first determining module inside a determining unit according to an embodiment of the present disclosure.

Further, as shown in FIG. 13, the first determining module 9022 includes a first calculating submodule 9022a, a first acquiring submodule 9022b, and a first determining submodule 9022c.

The first calculating submodule 9022a is configured to calculate, according to the maximum air interface transmission delay and with reference to the state information of the current service of the base station, a first bandwidth required by the maximum air interface transmission delay of the first service.

The first acquiring submodule 9022b is configured to add the first bandwidth obtained by means of the calculation by the first calculating submodule 9022a to a maximum bandwidth required by the current service of the base station, to acquire a second bandwidth.

The first determining submodule 9022c is configured to determine, if the second bandwidth does not exceed a bandwidth of a frequency band of the base station, that the condition for guaranteeing the air interface transmission delay of the first service is satisfied.

Further, the state information of the current service of the base station includes a correspondence between transmission delays and average scheduling spectral efficiency.

The first calculating submodule 9022a is configured to determine, according to the maximum air interface transmission delay and the correspondence between transmission delays and average scheduling spectral efficiency, average scheduling spectral efficiency corresponding to the maximum air interface transmission delay; and calculate, according to the average scheduling spectral efficiency and a parameter of the future network transmission rate, the first bandwidth required by the maximum air interface transmission delay.

Further, the first service is a unidirectional downloading service.

The acquiring module 9021 is configured to calculate a first wired transmission delay and a first wired transmission packet loss rate according to the second parameter, where the first wired transmission delay is a delay of wired transmission from the server to the base station, and the first wired transmission packet loss rate is a packet loss rate of the wired transmission from the server to the base station; subtract the first wired transmission delay from the end-to-end delay in the first parameter, to acquire the maximum air interface transmission delay; and subtract the first wired transmission packet loss rate from the end-to-end packet loss rate in the first parameter, to acquire the maximum packet loss rate.

Further, the second parameter includes a transmission characteristic parameter of the base station to the server; or a transmission characteristic parameter of a PGW to the server and a transmission characteristic parameter of the PGW to the base station.

Further, the transmission characteristic parameter of the PGW to the base station includes a transmission characteristic parameter of a first path from the PGW to the base station.

The first path is determined by the PGW according to the transmission characteristic parameter of the PGW to the server, and the end-to-end delay and the end-to-end packet loss rate in the first parameter.

Further, the future network transmission rate includes at least one of the following: a maximum transmission rate, an average transmission rate, a mean square error of transmission rate variations, and time correlation of transmission rate variations.

Optionally, the first service is a bidirectional call service.

The acquiring unit 901 is further configured to acquire a call delay and a call packet loss rate that are guaranteed by a peer base station of the base station.

The acquiring module 9021 is configured to calculate a first wired transmission delay and a first wired transmission packet loss rate according to the second parameter, where the first wired transmission delay is a delay of wired transmission from the current base station to the peer base station, and the first wired transmission packet loss rate is a packet loss rate of the wired transmission from the current base station to the peer base station; subtract a sum of the first wired transmission delay and the call delay guaranteed by the peer base station from the end-to-end delay in the first parameter, to acquire the maximum air interface transmission delay; and subtract a sum of the first wired transmission packet loss rate and the call packet loss rate guaranteed by the peer base station from the end-to-end packet loss rate in the first parameter, to acquire the maximum packet loss rate.

Further, the second parameter includes a transmission characteristic parameter of the current base station to the peer base station.

Further, the future network transmission rate includes at least one of the following: a maximum voice transmission rate and a voice activity factor.

Further, the transmission characteristic parameter includes at least one of the following: an average transmission delay, a transmission delay mean square error, and an average transmission packet loss rate.

Further, the determining unit 902 is further configured to determine a corresponding charging standard according to the performance parameter of the QoS of the first service.

For a method of performing wireless communication using the PCRF entity, refer to the description of Embodiment 1 and Embodiment 2, which is not described again in this embodiment of the present disclosure.

This embodiment of the present disclosure provides a PCRF entity, including an acquiring unit, a determining unit, a decision unit, and an execution unit. The acquiring unit acquires a first parameter, a second parameter, and state information of a current service of a base station, where the first parameter is a performance parameter of QoS of a first service requested by a current UE, and the second parameter is a transmission characteristic parameter that characterizes wired transmission of the first service; the determining unit determines, according to the first parameter and the second parameter, and the state information of the current service of the base station, whether a condition for guaranteeing QoS of a service is satisfied. If it is determined that the condition for guaranteeing the QoS of the service is satisfied, the decision unit decides to provide the UE with the first service having a corresponding QoS guarantee; or if it is determined that the condition for guaranteeing the QoS of the service is not satisfied, the execution unit executes a first operation. The PCRF entity can determine, on the basis that a characteristic of wired transmission is acquired, whether the condition for guaranteeing the QoS of the service is satisfied. Therefore, using the PCRF entity, an end-to-end delay in a wireless communications process can be guaranteed, and quality of service in the wireless communications process can be improved.

Embodiment 4

Figure 14:
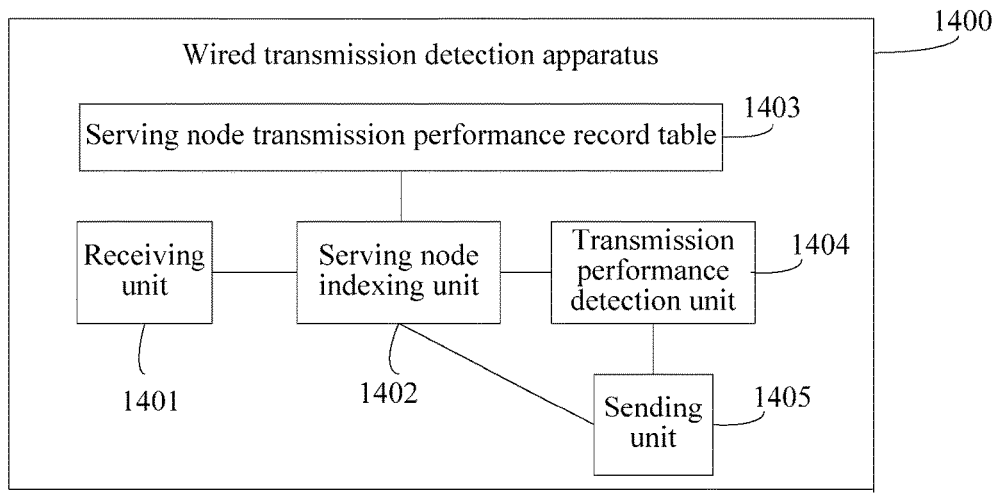
FIG. 14 is a schematic structural diagram of a wired transmission detection apparatus according to an embodiment of the present disclosure.

This embodiment of the present disclosure provides a wired transmission detection apparatus 1400. As shown in FIG. 14, the wired transmission detection apparatus 1400 includes a receiving unit 1401, a serving node indexing unit 1402, a serving node transmission performance record table 1403, a transmission performance detection unit 1404, and a sending unit 1405.

The receiving unit 1401 is configured to receive a first request message, where the first request message requests to acquire a third parameter, the third parameter is a transmission characteristic parameter of the wired transmission detection apparatus 1400 to a first network node, and the first request message carries an identifier of the first network node.

The first network node may be a server, a PGW, an SGW, or the like, which is not specifically limited in this embodiment of the present disclosure.

The wired transmission detection apparatus 1400 may be deployed in a base station, or may be deployed in a PGW. A deployment location of the wired transmission detection apparatus 1400 is not specifically limited in this embodiment of the present disclosure.

Exemplarily, if the first network node is a server, and the wired transmission detection apparatus 1400 is deployed in a base station, the third parameter is a transmission characteristic parameter of the base station to the server.

If the first network node is a server, and the wired transmission detection apparatus 1400 is deployed in a PGW, the third parameter is a transmission characteristic parameter of the PGW to the server.

In a case of a bidirectional call service, if the first network node is a second base station, and the wired transmission detection apparatus 1400 is deployed in a first base station, the third parameter is a transmission characteristic parameter of the first base station to the second base station.

The transmission characteristic parameter may include at least one of the following: an average transmission delay, a transmission delay mean square error, and an average transmission packet loss rate.

The serving node indexing unit 1402 is configured to index the prestored serving node transmission performance record table 1403 according to the identifier of the first network node received by the receiving unit 1401, to determine whether the third parameter exists, where the serving node transmission performance record table 1403 records a transmission characteristic parameter of the wired transmission detection apparatus 1400 to each serving node, and the serving node is a network node that has been detected by the wired transmission detection apparatus 1400.

More specifically, the wired transmission detection apparatus 1400 includes the serving node transmission performance record table 1403, where the serving node transmission performance record table 1403 may be various storage media, including a hard disk, a solid-state disk, a RAM, a magnetic tape, and the like, which is not specifically limited in this embodiment of the present disclosure.

Assuming that the transmission characteristic parameter includes an average transmission delay, a transmission delay mean square error, and an average transmission packet loss rate, a feasible serving node transmission performance record table may be shown in the foregoing Table 2, which is not specifically limited in this embodiment of the present disclosure.

After the wired transmission detection apparatus 1400 detects a transmission performance parameter of a network node, the wired transmission detection apparatus 1400 records the transmission performance parameter in the serving node transmission performance record table 1403.

It should be noted that, if serving node list information already includes the network node, only the transmission performance parameter corresponding to the network node may be updated; or if the serving node list information does not include the network node, an identifier of the network node is recorded in the serving node list information, and then the transmission performance parameter is stored at a transmission performance list location corresponding to the network node.

The transmission performance detection unit 1404 is configured to perform detection of the third parameter when the serving node indexing unit 1402 determines that the third parameter does not exist.

More specifically, if the serving node indexing unit 1402 included in the wired transmission detection apparatus 1400 does not find the identifier of the first network node in the serving node transmission performance record table 1403 by means of indexing, the serving node indexing unit 1402 starts the transmission performance detection unit 1404 to perform performance detection for the first network node.

More specifically, the transmission performance detection unit 1404 may continuously send a ping instruction to the first network node for 100 times, to acquire a required transmission performance parameter. By averaging delays of all responded data packets and then dividing an average delay by 2, an average transmission delay can be obtained, and then a square error of delays can be obtained. In addition to the ping instruction, a traceroute instruction may be used to obtain a delay parameter, or an echo service of the server may be used to obtain measurement data of a delay by means of reflection, which is not specifically limited in this embodiment of the present disclosure. By counting data packets that are not responded, a value of the data packet rate can be obtained.

The sending unit 1405 is configured to send the third parameter determined by the serving node indexing unit 1402 or the third parameter detected by the transmission performance detection unit 1404.

Exemplarily, if the wired transmission detection apparatus 1400 is deployed in a base station, the first request message requests to acquire a transmission characteristic parameter to the server, and at this time, another UE served by the base station has sent a request to the server and has acquired a service of the server, a transmission characteristic parameter of the server to the base station can be found in the serving node transmission performance record table 1403, and therefore, the wired transmission detection apparatus 1400 may directly send the third parameter to a network node that sends the first request message.

Alternatively, after obtaining the third parameter, the transmission performance detection unit 1404 may record, in the serving node transmission performance record table 1403, an identifier of the first network node and a transmission performance parameter of the first network node, for a query next time, and send the transmission performance parameter to the network node that sends the first request message.

Further, the serving node transmission performance record table 1403 records a transmission characteristic parameter at a first moment that is corresponding to the first serving node.

The transmission performance detection unit 1404 is further configured to perform detection of a transmission characteristic parameter at a second moment that is corresponding to the first serving node.

The sending unit 1405 is further configured to, if a deviation between the transmission characteristic parameter at the first moment and the transmission characteristic parameter at the second moment is greater than a first threshold, send a first instruction message to a PCRF entity, where the first instruction message instructs the PCRF entity to acquire a first parameter again, the first parameter is a related performance parameter of QoS of a first service requested by a current UE, and the first parameter includes parameters of an end-to-end delay, an end-to-end packet loss rate, and a future network transmission rate.

For a method of performing wireless communication using the wired transmission detection apparatus 1400, refer to the description of Embodiment 1 and Embodiment 2, which is not described again in this embodiment of the present disclosure.

Based on a wired transmission detection apparatus provided by this embodiment of the present disclosure, the wired transmission detection apparatus performs detection of a characteristic of transmission over an external network, such that the PCRF entity can determine, on the basis that a characteristic of wired transmission is acquired, whether the condition for guaranteeing the QoS of the service is satisfied; and then, an end-to-end delay in a wireless communications process can be guaranteed, and quality of service in the wireless communications process can be improved.

Embodiment 5

Figure 15:
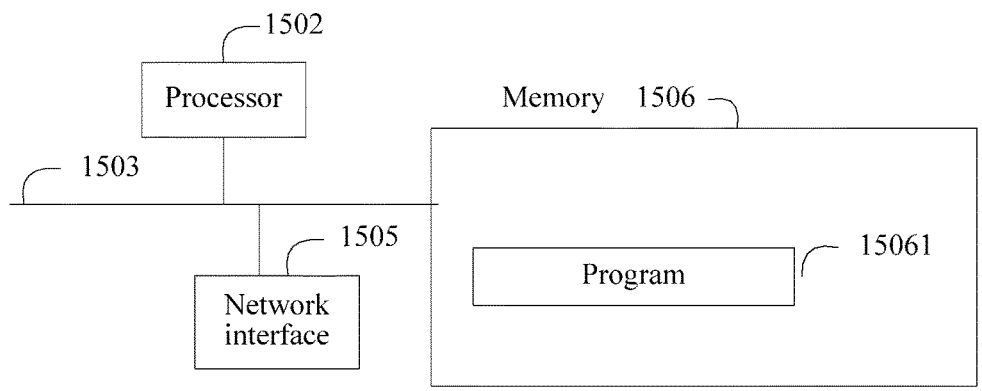
FIG. 15 is a schematic structural diagram of a PCRF entity according to an embodiment of the present disclosure.

FIG. 15 describes a structure of a PCRF entity provided by an embodiment of the present disclosure, where the PCRF entity includes at least one processor 1502 (for example, a CPU), at least one network interface 1505 or another communications interface, a memory 1506, and at least one communications bus 1503 that is configured to implement connection and communication between these apparatuses. The processor 1502 is configured to execute an executable module stored in the memory 1506, for example, a computer program. The memory 1506 may include a high-speed RAM, and may further include a non-volatile memory, for example, at least one magnetic disk storage. Communication connection between the system gateway and at least one other network element is implemented using the at least one network interface 1505 (which may be wired or wireless), where the Internet, a wide area network, a local area network, a metropolitan area network, or the like may be used.

In some implementation manners, the memory 1506 stores a program 15061, and the program 15061 may be executed by the processor 1502. This program includes acquiring, by a PCRF entity, a first parameter, where the first parameter is a performance parameter of QoS of a first service requested by a current UE; acquiring a second parameter, where the second parameter is a transmission characteristic parameter that characterizes wired transmission of the first service; acquiring state information of a current service of a base station; determining, according to the first parameter, the second parameter, and the state information of the current service of the base station, whether a condition for guaranteeing QoS of a service is satisfied, where the service includes the first service and the current service of the base station; and if it is determined that the condition for guaranteeing the QoS of the service is satisfied, permitting providing the UE with the first service having a corresponding QoS guarantee; or if it is determined that the condition for guaranteeing the QoS of the service is not satisfied, executing a first operation.

For a method of performing wireless communication using the PCRF entity, refer to the description of Embodiment 1 and Embodiment 2, which is not described herein again.

According to the PCRF entity provided by this embodiment of the present disclosure, the PCRF entity can determine, on the basis that a characteristic of wired transmission is acquired, whether the condition for guaranteeing the QoS of the service is satisfied. Therefore, using the PCRF entity, an end-to-end delay in a wireless communications process can be guaranteed, and quality of service in the wireless communications process can be improved.

Embodiment 6

Figure 16:
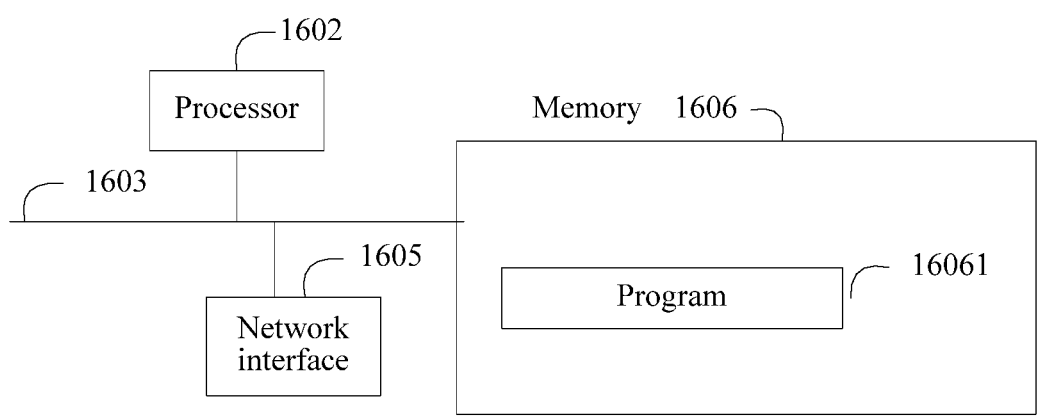
FIG. 16 is a schematic structural diagram of a wired transmission detection apparatus according to an embodiment of the present disclosure.

FIG. 16 describes a structure of a wired transmission detection apparatus provided by an embodiment of the present disclosure, where the wired transmission detection apparatus includes at least one processor 1602 (for example, a CPU), at least one network interface 1605 or another communications interface, a memory 1606, and at least one communications bus 1603 that is configured to implement connection and communication between these apparatuses. The processor 1602 is configured to execute an executable module stored in the memory 1606, for example, a computer program. The memory 1606 may include a high-speed RAM, and may further include a non-volatile memory, for example, at least one magnetic disk storage. Communication connection between the system gateway and at least one other network element is implemented using the at least one network interface 1605 (which may be wired or wireless), where the Internet, a wide area network, a local area network, a metropolitan area network, or the like may be used.

In some implementation manners, the memory 1606 stores a program 16061, and the program 16061 may be executed by the processor 1602. This program includes receiving, by the wired transmission detection apparatus, a first request message, where the first request message requests to acquire a third parameter, the third parameter is a transmission characteristic parameter of the wired transmission detection apparatus to a first network node, and the first request message carries an identifier of the first network node; indexing a prestored serving node transmission performance record table according to the identifier of the first network node, to determine whether the third parameter exists, where the serving node transmission performance record table records a transmission characteristic parameter of the wired transmission detection apparatus to each serving node, and the serving node is a network node that has been detected by the wired transmission detection apparatus; and if it is determined that the third parameter exists, sending the third parameter; or if the third parameter does not exist, performing detection of the third parameter, and sending the third parameter.

For a method of performing wireless communication using the wired transmission detection apparatus, refer to the description of Embodiment 1 and Embodiment 2, which is not described herein again.

Based on a wired transmission detection apparatus provided by this embodiment of the present disclosure, the wired transmission detection apparatus performs detection of a characteristic of transmission over an external network, such that the PCRF entity can determine, on the basis that a characteristic of wired transmission is acquired, whether the condition for guaranteeing the QoS of the service is satisfied; and then, an end-to-end delay in a wireless communications process can be guaranteed, and quality of service in the wireless communications process can be improved.

Embodiment 7

This embodiment of the present disclosure provides a wireless communications system. As shown in FIG. 3 or FIG. 5, the system includes a PCRF entity 304, a wired transmission detection apparatus 307, an IMS 308, a base station 302, a PGW 305, an SGW 303, a server 306, and a UE 301.

The PCRF entity 304 is configured to acquire a first parameter, a second parameter, and state information of a current service of the base station 302, where the first parameter is a performance parameter of QoS of a first service requested by the current UE 301, and the second parameter is a transmission characteristic parameter that characterizes wired transmission of the first service; determine, according to the first parameter, the second parameter, and the state information of the current service of the base station 302, whether a condition for guaranteeing QoS of a service is satisfied, where the service includes the first service and the current service of the base station 302; and if it is determined that the condition for guaranteeing the QoS of the service is satisfied, permit providing the UE 301 with the first service having a corresponding QoS guarantee; or if it is determined that the condition for guaranteeing the QoS of the service is not satisfied, execute a first operation.

The wired transmission detection apparatus 307 is configured to receive a first request message, where the first request message requests to acquire a third parameter, the third parameter is a transmission characteristic parameter of the wired transmission detection apparatus 307 to a first network node, and the first request message carries an identifier of the first network node; index a prestored serving node transmission performance record table according to the identifier of the first network node, to determine whether the third parameter exists, where the serving node transmission performance record table records a transmission characteristic parameter of the wired transmission detection apparatus 307 to each serving node, and the serving node is a network node that has been detected by the wired transmission detection apparatus 307; and if it is determined that the third parameter exists, send the third parameter; or if the third parameter does not exist, perform detection of the third parameter, and send the third parameter.

It should be noted that, the wired transmission detection apparatus may be deployed in the base station, or may be deployed in the PGW, or may be deployed in another network node. FIG. 3 and FIG. 5 merely exemplarily provide two deployment locations of the wired transmission detection apparatus, and this embodiment of the present disclosure does not specifically limit a deployment location of the wired transmission detection apparatus.

For a method of performing wireless communication using the wireless communications system, refer to the description of Embodiment 1 and Embodiment 2, which is not described again in this embodiment of the present disclosure.

Based on the wireless communications system provided by this embodiment of the present disclosure, the wired transmission detection apparatus in the system performs detection of a characteristic of transmission over an external network, such that the PCRF entity can determine, on the basis that a characteristic of wired transmission is acquired, whether the condition for guaranteeing the QoS of the service is satisfied; therefore, an end-to-end delay in a unidirectional downloading service can be guaranteed, and quality of service in a wireless communications process can be improved.

Embodiment 8

Figure 7:
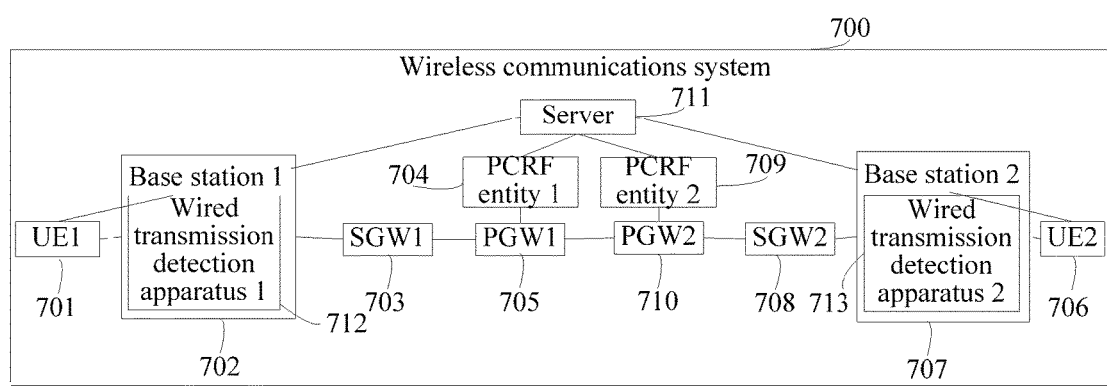
FIG. 7 is a wireless communications system according to an embodiment of the present disclosure.
Figure 8A:
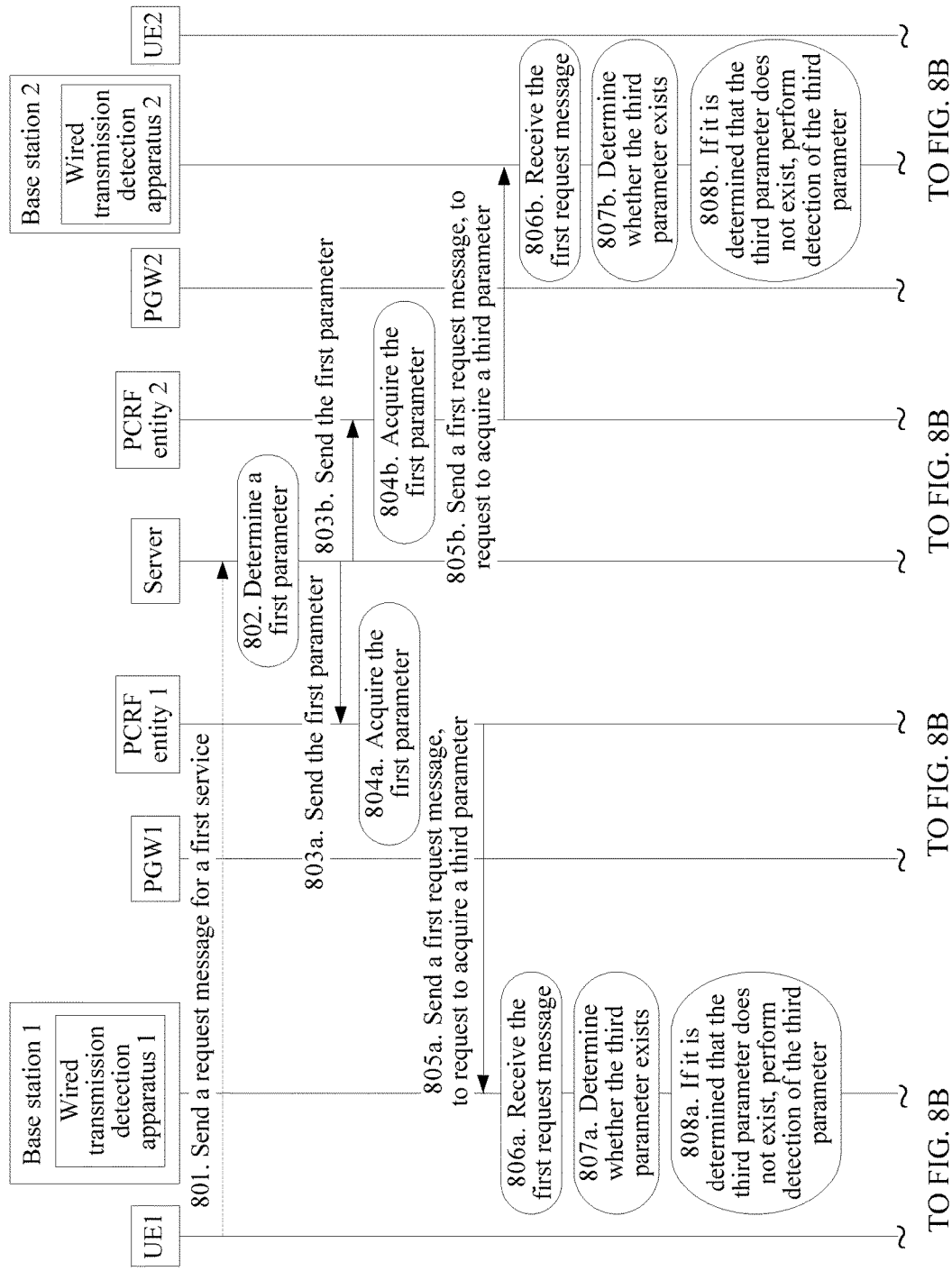
Figure 8B:
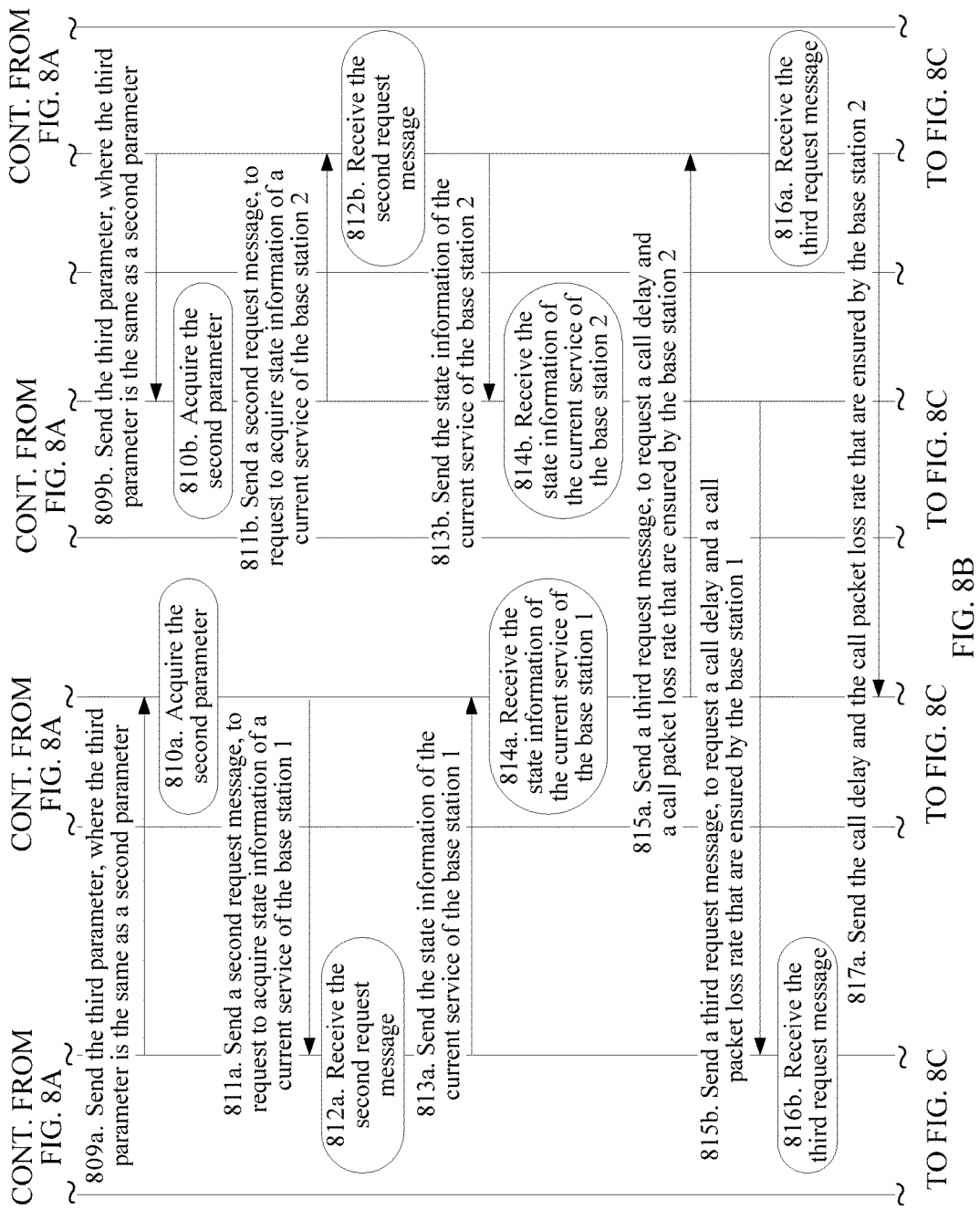
Figure 8D:
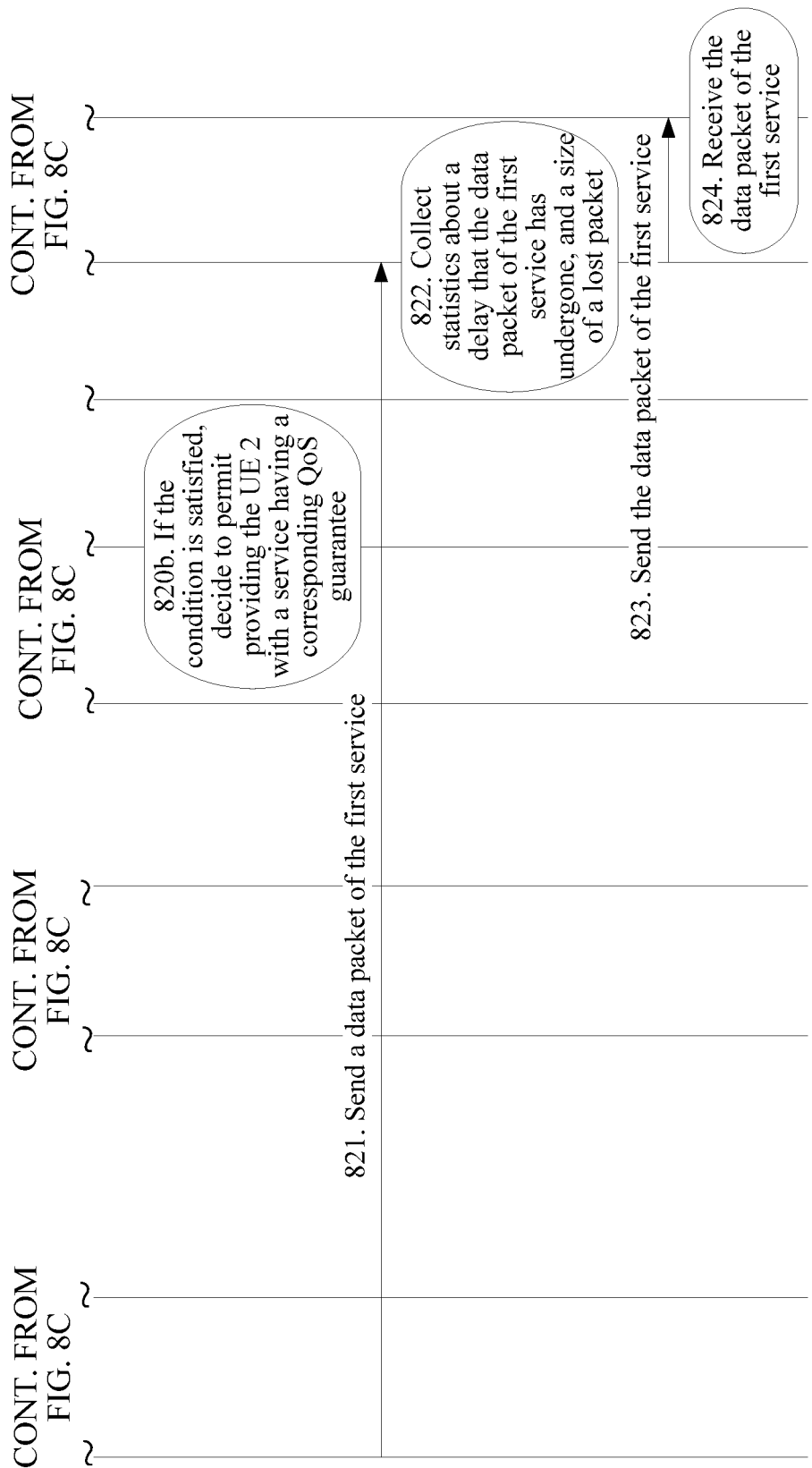

This embodiment of the present disclosure provides a wireless communications system 700. As shown in FIG. 7, the system 700 includes a first PCRF entity 704, a second PCRF entity 709, a first wired transmission detection apparatus 712, a second wired transmission detection apparatus 713, a first base station 702, a second base station 707, a first PGW 705, a second PGW 710, a first SGW 703, a second SGW 708, a first UE 701, a second UE 706, and a server 711.

The first/second PCRF entity is configured to acquire a first parameter, a second parameter, and state information of a current service of the first/second base station, where the first parameter is a performance parameter of QoS of a first service requested by the first/second UE, and the second parameter is a transmission characteristic parameter that characterizes wired transmission of the first service; determine, according to the first parameter, the second parameter, and the state information of the current service of the first/second base station, whether a condition for guaranteeing QoS of a service is satisfied, where the service includes the first service and the current service of the base station; and if it is determined that the condition for guaranteeing the QoS of the service is satisfied, permit providing the first/second UE with the first service having a corresponding QoS guarantee; or if it is determined that the condition for guaranteeing the QoS of the service is not satisfied, execute a first operation.

The first/second wired transmission detection apparatus is configured to receive a first request message, where the first request message requests to acquire a third parameter, the third parameter is a transmission characteristic parameter of the first/second wired transmission detection apparatus to a first network node, and the first request message carries an identifier of the first network node; index a prestored serving node transmission performance record table according to the identifier of the first network node, to determine whether the third parameter exists, where the serving node transmission performance record table records a transmission characteristic parameter of the first/second wired transmission detection apparatus to each serving node, and the serving node is a network node that has been detected by the first/second wired transmission detection apparatus; and if it is determined that the third parameter exists, send the third parameter; or if the third parameter does not exist, perform detection of the third parameter, and send the third parameter.

It should be noted that, the first/second wired transmission detection apparatus may be deployed in the base station, or may be deployed in another network node. FIG. 7 merely exemplarily provides an architecture of a wireless communications system in a bidirectional call service, and does not specifically limit a deployment location of the first/second wired transmission detection apparatus.

For a method of performing wireless communication using the wireless communications system, refer to the description of Embodiment 1 and Embodiment 2, which is not described again in this embodiment of the present disclosure.

Based on the wireless communications system provided by this embodiment of the present disclosure, the wired transmission detection apparatus in the system performs detection of a characteristic of transmission over an external network, such that the PCRF entity can determine, on the basis that a characteristic of wired transmission is acquired, whether the condition for guaranteeing the QoS of the service is satisfied. Therefore, an end-to-end delay in a bidirectional call service can be guaranteed, and quality of service in a wireless communications process can be improved.

It may be clearly understood by a person skilled in the art that, for the purpose of convenient and brief description, division of the foregoing functional modules is taken as an example for illustrating the apparatus described above. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some characteristics may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of the present disclosure. The foregoing storage medium includes any medium that can store program code, such as a universal serial bus (USB) flash drive, a removable hard disk, a read-only memory (ROM), a RAM, a magnetic disk, or an optical disc.

The foregoing descriptions are merely implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A policy and charging rules function (PCRF) entity, comprising:
   a processor; and
   a non-transitory computer-readable storage medium coupled to the processor and storing programming instructions for execution by the processor, wherein the programming instructions instruct the processor to:
   acquire a first parameter, wherein the first parameter is a performance parameter of quality of service (QoS) of a first service requested by a current user equipment, and wherein the first parameter comprises at least one of an end-to-end delay, an end-to-end packet loss rate, or a future network transmission rate;
   acquire a second parameter, wherein the second parameter is a transmission characteristic parameter that characterizes wired transmission of the first service;
   acquire state information of a current service of a base station;
   determine, based on the first parameter, the second parameter, and the state information of the current service of the base station, whether a condition for guaranteeing QoS of a service is satisfied, wherein the service comprises the first service and the current service of the base station;
   permit providing the user equipment with the first service when it is determined that the condition for guaranteeing the QoS of the service is satisfied; and
   execute a first operation when it is determined that the condition for guaranteeing the QoS of the service is not satisfied,
   wherein, determining whether a condition for guaranteeing QoS of the service is satisfied comprises:

acquiring a maximum air interface transmission delay and a maximum packet loss rate based on the first parameter and the second parameter; and determining that the condition for guaranteeing the QoS of the service is satisfied when it is determined, based on the maximum air interface transmission delay and the state information of the current service of the base station, that a condition for guaranteeing an air interface transmission delay of the first service is satisfied, and it is determined, based on the maximum packet loss rate and the state information of the current service of the base station, that a condition for guaranteeing a maximum packet loss rate of the first service is satisfied.

2. The PCRF entity of claim 1, wherein the programming instructions that cause the processor to acquire the second parameter comprise instructions that cause the processor to perform at least one of:

request, by sending a first request message to another network node, to acquire the second parameter; and acquire the second parameter by reading stored record data of the second parameter.

3. The PCRF entity of claim 1, wherein the programming instructions that cause the processor to acquire state information of the current service of the base station comprise instructions that cause the processor to perform at least one of:

request, by sending a second request message to the base station, to acquire the state information of the current service of the base station; and acquire the state information of the current service of the base station by reading stored record data of service state information of the base station.

4. The PCRF entity of claim 1, wherein the programming instructions that cause the processor to execute the first operation comprise instructions that cause the processor to:

send a third request message to a server, to request to re-determine the first parameter;

acquire a first parameter re-determined by the server; and determine, according to the re-determined first parameter and the second parameter, and with reference to the state information of the current service of the base station, whether the condition for guaranteeing the QoS of the service is satisfied, until it is determined that the condition for guaranteeing the QoS of the service is satisfied.

5. The PCRF entity of claim 1, wherein the programming instructions that cause the processor to execute the first operation comprise instructions that cause the processor to reject establishing a connection to the first service.

6. The PCRF entity of claim 1, wherein the programming instructions that cause the processor to determine that the condition for guaranteeing an air interface transmission delay of the first service is satisfied comprise instructions that cause the processor to:

calculate, according to the maximum air interface transmission delay and with reference to the state information of the current service of the base station, a first bandwidth required by the maximum air interface transmission delay of the first service;

add the first bandwidth to a maximum bandwidth required by the current service of the base station, to acquire a second bandwidth; and determine that the condition for guaranteeing the air interface transmission delay of the first service is satisfied when the second bandwidth does not exceed a bandwidth of a frequency band of the base station.

7. The PCRF entity of claim 6, wherein the state information of the current service of the base station comprises a correspondence between transmission delays and average scheduling spectral efficiency, and wherein the programming instructions that cause the processor to calculate the first bandwidth by the maximum air interface transmission delay comprises instructions that cause the processor to:

determining, according to the maximum air interface transmission delay and the correspondence between transmission delays and average scheduling spectral efficiency, average scheduling spectral efficiency corresponding to the maximum air interface transmission delay; and calculating, according to the average scheduling spectral efficiency and a parameter of the future network transmission rate, the first bandwidth required by the maximum air interface transmission delay.

8. The PCRF entity of claim 1, wherein the first service is a unidirectional downloading service, and wherein the programming instructions that cause the processor to acquire the maximum air interface transmission delay and the maximum packet loss rate comprise instructions that cause the processor to:

calculate a first wired transmission delay and a first wired transmission packet loss rate according to the second parameter, wherein the first wired transmission delay is a delay of wired transmission from a server to the base station, and wherein the first wired transmission packet loss rate is a packet loss rate of the wired transmission from the server to the base station;

subtract the first wired transmission delay from the end-to-end delay in the first parameter, to acquire the maximum air interface transmission delay; and subtract the first wired transmission packet loss rate from the end-to-end packet loss rate in the first parameter, to acquire the maximum packet loss rate.

9. The PCRF entity claim 8, wherein the second parameter comprises at least one of:

a transmission characteristic parameter of the base station to the server; and a transmission characteristic parameter of a packet data gateway (PGW) to the server and a transmission characteristic parameter of the PGW to the base station.

10. The PCRF entity of claim 9, wherein the transmission characteristic parameter of the PGW to the base station comprises a transmission characteristic parameter of a first path from the PGW to the base station, and wherein the first path is determined by the PGW according to the transmission characteristic parameter of the PGW to the server, and the end-to-end delay and the end-to-end packet loss rate in the first parameter.

11. The PCRF entity of claim 8, wherein the future network transmission rate comprises at least one of:

a maximum transmission rate;

an average transmission rate;

a mean square error of transmission rate variations; and time correlation of transmission rate variations.

12. The PCRF entity of claim 1, wherein the first service is a bidirectional call service, wherein, before the maximum air interface transmission delay and the maximum packet loss rate are acquired, a call delay and a call packet loss rate that are guaranteed by a peer base station of the base station are acquired, and wherein the programming instructions that cause the processor to acquire the maximum air interface transmission delay and the maximum packet loss rate comprise instructions that cause the processor to:

calculate a first wired transmission delay and a first wired transmission packet loss rate according to the second parameter, wherein the first wired transmission delay is a delay of wired transmission from a current base station to the peer base station, and wherein the first wired transmission packet loss rate is a packet loss rate of the wired transmission from the current base station to the peer base station;

subtract a sum of the first wired transmission delay and the call delay guaranteed by the peer base station from the end-to-end delay in the first parameter, to acquire the maximum air interface transmission delay; and subtract a sum of the first wired transmission packet loss rate and the call packet loss rate guaranteed by the peer base station from the end-to-end packet loss rate in the first parameter, to acquire the maximum packet loss rate.

13. The PCRF entity of claim 12, wherein the second parameter comprises a transmission characteristic parameter from the current base station to the peer base station.

14. The PCRF entity of claim 12, wherein the future network transmission rate comprises at least one of a maximum voice transmission rate and a voice activity factor.

15. The PCRF entity of claim 1, wherein the transmission characteristic parameter comprises at least one of:
an average transmission delay;
a transmission delay mean square error; and
an average transmission packet loss rate.

16. The PCRF entity of claim 1, wherein, when it is determined that the condition for guaranteeing the QoS of the service is satisfied, the programming instructions further instruct the processor to determine a corresponding charging standard according to the performance parameter of the QoS of the first service.

17. A wireless communications method, comprising:
acquiring, by a policy and charging rules function (PCRF) entity, a first parameter, wherein the first parameter is a performance parameter of quality of service (QoS) of a first service requested by a current user equipment, wherein the first parameter comprises at least one of an end-to-end delay, an end-to-end packet loss rate, or a future network transmission rate;

acquiring a second parameter, wherein the second parameter is a transmission characteristic parameter that characterizes wired transmission of the first service;

acquiring state information of a current service of a base station;

determining, according to the first parameter, the second parameter, and the state information of the current service of the base station, whether a condition for guaranteeing QoS of a service is satisfied, wherein the service comprises the first service and the current service of the base station;

permitting providing the user equipment with the first service having a corresponding QoS guarantee when it is determined that the condition for guaranteeing the QoS of the service is satisfied; and executing a first operation when it is determined that the condition for guaranteeing the QoS of the service is not satisfied, wherein determining, according to the first parameter, the second parameter, and the state information of the current service of the base station, whether a condition for guaranteeing QoS of a service is satisfied comprises:

acquiring a maximum air interface transmission delay and a maximum packet loss rate according to the first parameter and the second parameter; and determining that the condition for guaranteeing QoS of the service is satisfied when it is determined, according to the maximum air interface transmission delay and the state information of the current service of the base station, that a condition for guaranteeing an air interface transmission delay of the first service is satisfied, and it is determined, according to the maximum packet loss rate and the state information of the current service of the base station, that a condition for guaranteeing a maximum packet loss rate of the first service is satisfied.

* * * * *

UNITED STATES PATENT AND TRADEMARK OFFICE
CERTIFICATE OF CORRECTION

PATENT NO. : 10,028,289 B2
APPLICATION NO. : 14/971447
DATED : July 17, 2018
INVENTOR(S) : Lei Zhou, Yuqun Fan and Weihua Qiao Page 1 of 1

It is certified that error appears in the above-identified patent and that said Letters Patent is hereby corrected as shown below:

On the Title Page

Item (30), Line 1: "201310311794" should be "201310311749.9"

In the Claims

Column 46, Line 6: insert --required-- after "bandwidth"

Column 46, Line 7: "comprises" should be "comprise"

Column 46, Line 8: "determining" should be "determine"

Column 46, Line 14: "calculating" should be "calculate"

Column 46, Line 37: insert --of-- after "entity"

Signed and Sealed this
Fourth Day of September, 2018

Andrei Iancu
*Director of the United States Patent and Trademark Office*